(12) United States Patent
Lai et al.

(10) Patent No.: US 12,534,768 B2
(45) Date of Patent: Jan. 27, 2026

(54) CORN EVENT 2A-7 AND IDENTIFICATION METHOD THEREFOR

(71) Applicant: Beijing Grainsmeta Biotech Co., LTD, Beijing (CN)

(72) Inventors: Jinsheng Lai, Beijing (CN); Haiming Zhao, Beijing (CN); Weibin Song, Beijing (CN)

(73) Assignee: Beijing Grainsmeta Biotech Co., LTD, Beijing (CN)

( * ) Notice: Subject to any disclaimer, the term of this patent is extended or adjusted under 35 U.S.C. 154(b) by 270 days.

(21) Appl. No.: 18/020,259

(22) PCT Filed: Nov. 4, 2020

(86) PCT No.: PCT/CN2020/126452
§ 371 (c)(1),
(2) Date: Feb. 7, 2023

(87) PCT Pub. No.: WO2022/094790
PCT Pub. Date: May 12, 2022

(65) Prior Publication Data
US 2023/0304105 A1     Sep. 28, 2023

(51) Int. Cl.
| | | |
|---|---|---|
| A01H 6/46 | (2018.01) | |
| A01H 1/00 | (2006.01) | |
| A01H 5/10 | (2018.01) | |
| C12Q 1/68 | (2018.01) | |
| C12Q 1/6895 | (2018.01) | |

(52) U.S. Cl.
CPC ........... *C12Q 1/6895* (2013.01); *A01H 1/127* (2021.01); *A01H 5/10* (2013.01); *A01H 6/4684* (2018.05); *C12Q 2600/13* (2013.01); *C12Q 2600/158* (2013.01)

(58) Field of Classification Search
None
See application file for complete search history.

(56) References Cited

U.S. PATENT DOCUMENTS

2008/0256669 A1    10/2008    Fabbri et al.

FOREIGN PATENT DOCUMENTS

| CN | 101495635 A | 7/2009 |
|---|---|---|
| CN | 106591352 A | 4/2017 |
| CN | 106701997 A | 5/2017 |
| CN | 106916844 A | 7/2017 |
| CN | 109536490 A | 3/2019 |
| CN | 109971880 A | 7/2019 |
| CN | 110273021 A | 9/2019 |
| CN | 110951728 A | 4/2020 |
| CN | 110982829 A | 4/2020 |
| CN | 112280743 A | 1/2021 |
| WO | WO-2007/140256 A1 | 12/2007 |
| WO | WO-2016/173362 A1 | 11/2016 |
| WO | WO-2018/090715 A1 | 5/2018 |

OTHER PUBLICATIONS

International Search Report and Written Opinion mailed on Jul. 28, 2021, for PCT Application No. PCT/CN2020/126452, 7 pages.
Ling, L. et al. (2015). "G10evo Cry1Ab/Cry2Ab GAB-3" J. Environ. Health 32(2):112-115 (with English Abstract Provided).
Yin, Y. et al. (2020). "Impact assessment of Bt maize expressing the Cry1Ab and Cry2Ab protein simultaneously on non-target arthropods" Environ. Sci. Pollut. Res. Int. 27(17):21552-21559.

*Primary Examiner* — Medina A Ibrahim

(57) ABSTRACT

Provided are a transgenic corn event 2A-7, and corn plants or parts, seeds, cells, or progenies thereof containing nucleic acid molecules for diagnosing the corn event. The event shows resistance to lepidopteran insect infestation. Further provided are a method for detecting the presence of nucleic acid molecules unique to the corn event in a sample, and a probe and a primer for detecting the presence of the corn event in the sample. Further provided is a method for producing corn plants and seeds containing the nucleic acid molecules for the corn event.

12 Claims, 6 Drawing Sheets

Specification includes a Sequence Listing.

US 12,534,768 B2

CORN EVENT 2A-7 AND IDENTIFICATION METHOD THEREFOR

CROSS REFERENCE TO RELATED APPLICATION

This application is a U.S. National Phase application, filed under 35 U.S.C. § 371 (c) of International Application No. PCT/CN2020/126452, filed Nov. 4, 2020, the entire contents of which are incorporated by reference herein in its entirety for all purposes.

DESCRIPTION OF THE TEXT FILE SUBMITTED ELECTRONICALLY

The contents of the text file submitted electronically herewith are incorporated herein by reference in their entirety: A computer readable format copy of the Sequence Listing (filename: CCPI-031_00US_SeqList_ST25.txt, date recorded: Feb. 2, 2023, file size 24,096 bytes).

TECHNICAL FIELD

The present invention relates to a transgenic corn event 2A-7, and a corn plant or a part, seed, cell or progeny thereof containing a nucleic acid molecule for diagnosing the corn event. The present invention also provides a method for detecting the presence of a nucleic acid molecule unique to the corn event in a sample, as well as a probe and primer for detecting the presence of the corn event in a sample. The invention further relates to a method of producing an insect-resistant corn plant and seed.

BACKGROUND ART

Corn is the world's most widely planted cereal crop with the largest yield, ranking first among the three major grains (corn, wheat and rice). However, the current pest damage of corn is serious. There are about 350 species of corn pests worldwide, in which the stem-boring and leaf-eating lepidopteran pest, corn borer, is the most widely distributed and the most harmful, and is the most important corn pest worldwide. Its damage has seriously affected the yield and quality of corn and causes huge economic losses to corn production. Therefore, taking effective measures to control its damage is an urgent problem to be solved for increasing corn yield and increasing farmers' income.

For a long time, due to the lack of suitable insect-resistant varieties, the main method to control insect pest is to spray chemical pesticides during the growth process. However, chemical pesticides not only kill pests, but also kill their natural enemies, causing damage to the ecological balance and environmental pollution. Therefore, there is an urgent need for corn plants resistant to corn pests, particularly lepidopteran pests.

Insect resistance genes can be introduced into corn varieties through transgenic technology to improve the insect resistance of transgenic corn. At the same time, since each plant of the transgenic corn has a considerable degree of resistance, its insect resistance effect is significantly better and more stable than that of spraying pesticides, thereby further saving manpower and material resources, and effectively saving social resources.

However, the integration of a foreign gene in a host plant genome is random. If the foreign gene happens to be inserted into a very important host gene, and mutation therefore occurs, the random insertion event may be lethal to the recipient plant. In addition, even if the random insertion event does not damage the function of the host cell gene, the expression of the inserted foreign gene may also be affected by the "location effect" caused by the surrounding genomic DNA. In some cases, the gene is inserted into the sites where the location effect is strong enough to prevent producing an effective amount of product from the introduced gene. Therefore, it is often necessary to screen a large number of events to identify good events characterized by optimal expression of the introduced target gene. It is necessary to identify one or more unique sequences that are only related to the good event in order to detect the presence of the transgenic event.

CONTENTS OF THE INVENTION

The present invention relates to a corn event called 2A-7, which comprises nucleic acid molecules encoding Cry1Ab and Cry2Ab proteins stably integrated in its genome, wherein the proteins impart an insect resistance to a 2A-7 corn plant. The seed of the corn event 2A-7 is deposited in the China General Microbiological Culture Collection Center (CGMCC), with the deposit number CGMCC NO. 17848. Under no insect stress, the transgenic corn plant has agronomic performance basically equivalent to that of the non-transgenic isogenic line. Under insect stress, the transgenic corn plant will have significantly improved resistance to the infestation of corn borer, armyworm, cotton bollworm, peach borer and other insects than the non-transgenic corn plants.

Corn Transformant 2A-7 and Products Thereof

Therefore, in a first aspect, the present invention provides a corn plant or part, seed, cell or progeny thereof, which has an exogenous nucleic acid molecule inserted into its genome, the exogenous nucleic acid molecule comprises Cry1Ab and Cry2Ab genes, wherein the exogenous nucleic acid molecule is flanked by a 5'-flanking region, and the 5'-flanking region has a nucleotide sequence of positions 1-432 or 300-432 of SEQ ID NO: 5, and the exogenous nucleic acid molecule is flanked by a 3'-flanking region, and the 3'-flanking region has a nucleotide sequence of positions 8532-9031 or 8532-8800 of SEQ ID NO: 5.

The present invention also provides a corn plant or part, seed, cell or progeny thereof, which has an exogenous nucleic acid molecule inserted into its genome, and the exogenous nucleic acid molecule comprises Cry1Ab and Cry2Ab genes, wherein the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

The corn plant or part, seed, cell or progeny thereof according to the present invention has resistance to an insect attack. In certain embodiments, the insect is selected from Lepidopteran insects. In certain embodiments, the insect is one or more selected from lepidopteran pests such as armyworm, corn borer (e.g., *Ostrinia furnacalis*), cotton bollworm, peach borer, and *Spodoptera frugiperda*. In some embodiments, the corn plant or part, seed, cell, or progeny thereof according to the present invention also has resistance to an herbicide (e.g., glyphosate, glufosinate, etc.).

In certain embodiments, the position of the exogenous nucleic acid molecule in the genome corresponds to that between Chr3: 179141694bp-179141724bp of the B73 reference genome sequence (V4 version). In some embodiments, the integration of the exogenous nucleic acid molecule results in the deletion of a partial sequence of the original genome. The deleted sequence is the sequence of Chr3: 179141695bp-179141723bp (B73 reference genome, V4 version), with a total of 29 bp. The deleted region is an endogenous corn gene Zm00001d042767, the function of this gene is predicted to be Glucan endo-13-beta-glucosidase 14, and the insertion of the target fragment and the deletion of the Chr3: 179141695bp-179141723bp sequence will inactivate the function of this gene. Corn has two copies of this gene, and the gene identifier of the other homologous gene is Zm00001d012292.

In certain embodiments, the nucleotide sequences of the Cry1Ab and Cry2Ab genes are codon-optimized for expression in a monocot (e.g., corn) cell. In certain embodiments, the Cry1Ab gene is shown in SEQ ID NO: 12. In certain embodiments, the Cry2Ab gene is shown in SEQ ID NO: 13.

In certain embodiments, the exogenous nucleic acid molecule further comprises Bar gene. In certain embodiments, the Bar gene is shown in SEQ ID NO: 14.

In certain embodiments, the exogenous nucleic acid molecule comprises 35S polyA terminator, Bar gene, CAMV 35S promoter, nos polyA terminator, Cry1Ab gene, Gly promoter, CAMV 35S promoter, adh1 enhancer, Cry2Ab gene and nos polyA terminator.

In certain embodiments, the exogenous nucleic acid molecule comprises a nucleotide sequence of positions 483-8524 of SEQ ID NO: 5 or a complementary sequence of the nucleotide sequence.

It is easy to understand that during the integration of a foreign nucleic acid into a genome, an unexpected integration sequence may be generated. This sequence is neither a genomic sequence nor a target insert fragment (e.g., T-border sequence), for example, it is a sequence generated by genome repair when the insert fragment is integrated. Therefore, the exogenous nucleic acid molecule inserted into the genome of the corn plant or part, seed, cell or progeny thereof according to the present invention may comprise this unexpected integration sequence. Therefore, in certain exemplary embodiments, the exogenous nucleic acid molecule comprises a nucleotide sequence of positions 433-8531 of SEQ ID NO: 5 or a complementary sequence of the nucleotide sequence.

In certain embodiments, the genome of the corn plant or part, seed, cell or progeny thereof comprises a sequence shown in any one of SEQ ID NOs: 1-5 or a complementary sequence thereof. In certain embodiments, the genome of the corn plant or part, seed, cell or progeny thereof comprises a sequence shown in SEQ ID NO: 5 or a complementary sequence thereof.

In some embodiments, when SEQ ID NO: 6 and SEQ ID NO: 7 are used as forward primer and reverse primer respectively to amplify the genomic DNA of the corn plant or part, seed, cell or progeny thereof, an amplicon with a length of about 200-300 bp (e.g., about 258 bp) is generated. In certain embodiments, when SEQ ID NO: 8 and SEQ ID NO: 9 are used as forward primer and reverse primer respectively to amplify the genomic DNA, an amplicon with a length of about 250-350 bp (e.g., about 310 bp) is generated.

In certain embodiments, a corn seed that produce the corn plant or part, seed, cell or progeny thereof is deposited in the China General Microbiological Culture Collection Center (CGMCC), with the deposit number CGMCC NO. 17848. In certain embodiments, the corn plant or part, seed, cell or progeny thereof is obtained by reproduction and/or breeding of a corn plant grown from the corn seed.

In a second aspect, the present invention provides a corn seed, which is deposited in the China General Microbiological Culture Collection Center (CGMCC), with the deposit number CGMCC NO. 17848. The present invention also provides a corn plant or part, seed, cell or progeny thereof that is produced from the corn seed as described in the second aspect. In certain embodiments, the corn plant or part, seed, cell or progeny thereof is obtained by reproduction and/or breeding of a corn plant grown from the corn seed as described in the second aspect.

In a third aspect, the present invention provides a product, which comprises the corn plant or part, seed, cell or progeny thereof as described in the first aspect, or the corn seed as described in the second aspect, or a corn plant or part, seed, cell or progeny thereof that is produced from the corn seed as described in the second aspect.

In certain embodiments, the product is a food, agricultural product (e.g., feed), cosmetic, medicament, or industrial product.

In certain embodiments, the product comprises a genomic DNA of the corn plant or part, seed, cell or progeny thereof as described in the first aspect, or a genomic DNA of the corn seed as described in the second aspect or a genomic DNA of a corn plant or part, seed, cell or progeny produced by the corn seed as described in the second aspect.

In certain embodiments, the product comprises a detectable amount of polynucleotide, and the polynucleotide is unique to corn event 2A-7.

In certain embodiments, the product comprises a sequence selected from any one of SEQ ID NOs: 1-5 or a complementary sequence thereof.

In some embodiments, when SEQ ID NO: 6 and SEQ ID NO: 7 are used as forward primer and reverse primer respectively to amplify the nucleic acid contained in the product, an amplicon with a length of about 200-300 bp (e.g., about 258 bp) is generated. In some embodiments, when SEQ ID NO: 8 and SEQ ID NO: 9 are used as forward primer and reverse primer respectively to amplify the nucleic acid contained in the product, an amplicon with a length of about 250-350 bp (e.g., about 310 bp) is generated.

In certain embodiments, the product is selected from the group consisting of corn ear, corn with husk removed, corn silk, corn pollen, corn grit, corn meal, crushed corn, corn flour, corn oil, corn starch, corn pulp, malted corn, corn sugar, corn syrup, margarine produced from corn oil, unsaturated corn oil, saturated corn oil, corn flakes, popcorn, ethanol and/or liquor produced from corn, distillers dried grains with solubles (DDGS) produced from corn fermentation, and animal feed, cosmetic and filler derived from corn.

In certain embodiments, the part of the corn plant described in any one of the preceding aspects is selected from the group consisting of kernel, pollen, ovule, flower, shoot, root, stalk, silk, tassel, ear and leaf.

The present invention also relates to a use of the corn plant or part, seed, cell or progeny thereof as described in any of the foregoing aspects in the manufacture of a food, agricultural product (e.g., feed), cosmetic, medicament or industrial product.

In certain embodiments, the corn plant or part, seed, cell or progeny thereof is used for the manufacture of a food, feed, starch or for wine making.

In certain embodiments, the part of the corn plant is selected from the group consisting of kernel, pollen, ovule, flower, shoot, root, stem, silk, tassel, ear and leaf.

In certain embodiments, the corn plant or part, seed, cell or progeny thereof is used in the manufacture of a product selected from the group consisting of corn ear, debracted corn (corn with bracts removed), corn silk, corn pollen, corn grit, corn meal, crushed corn, corn flour, corn oil, corn starch, corn pulp, malted corn, corn sugar, corn syrup, margarine produced from corn oil, unsaturated corn oil, saturated corn oil, corn flakes, popcorn, ethanol and/or liquor produced from corn, distillers dried grains with solubles (DDGS) produced from corn fermentation, and animal feed, cosmetic and filler derived from corn.

Method of Identifying Event 2A-7

In view of the random integration of exogenous fragment in plant genome in transgenic events, the insertion sites of exogenous fragments in the genomes of different transgenic events are different. For a specific transgenic event, the flanking sequence is specific. Therefore, the flanking sequence of the insert fragment can be used for specific detection of the transgenic event. For example, a probe containing part of the flanking sequence and part of the exogenous insert sequence can be used for hybridization, or a specific primer containing part of the flanking sequence and part of the exogenous insert sequence can be designed for PCR amplification.

Therefore, in a fourth aspect, the present invention provides a primer pair, which comprises a first primer and a second primer, wherein the first primer comprises: a nucleotide sequence composed of at least 15 consecutive nucleotides (e.g., at least 18; for example, 15-30 consecutive nucleotides, or 18-30 consecutive nucleotides) of the sequence of positions 1-432 (e.g., positions 200-432) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence; and the second primer comprises a nucleotide sequence composed of at least 15 consecutive nucleotides (e.g., at least 18; for example, 15-30 consecutive nucleotides, or 18-30 consecutive nucleotides) of the sequence of positions 483-8524 (e.g., positions 483-1000) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, when the first primer and the second primer are used to amplify the sequence shown in SEQ ID NO: 5, an amplicon with a length of 100-500 bp is generated. In certain embodiments, the amplicon has a length of 200-400 bp, such as 200-300 bp, for example about 258 bp.

In certain embodiments, the first primer comprises a nucleotide sequence composed of at least 15 consecutive nucleotides (e.g., at least 18; for example, 15-30 consecutive nucleotides, or 18-30 consecutive nucleotides) of the sequence of positions 300-400 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence, and the second primer comprises a nucleotide sequence composed of at least 15 consecutive nucleotides (e.g., at least 18; for example, 15-30 consecutive nucleotides, or 18-30 consecutive nucleotides) of the sequence of positions 500-600 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In certain embodiments, the first primer comprises a nucleotide sequence composed of at least 15 consecutive nucleotides (e.g., at least 18; for example, 15-30 consecutive nucleotides, or 18-30 consecutive nucleotides) of the sequence of positions 300-350 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, the second primer comprises a nucleotide sequence composed of at least 15 consecutive nucleotides (e.g., at least 18; for example, 15-30 consecutive nucleotides, or 18-30 consecutive nucleotides) of the sequence of positions 520-600 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, the first primer comprises a nucleotide sequence shown in SEQ ID NO: 6 or a sequence having a sequence identity of at least 80% (e.g., 80% to 100%, or 90% to 100%; or at least 85%, at least 90%, at least 95%, at least 99%, or 100%) as compared therewith, and the second primer comprises a nucleotide sequence shown in SEQ ID NO: 7 or a sequence having a sequence identity of at least 80% (e.g., 80% to 100%, or 90% to 100%; or at least 85%, at least 90%, at least 95%, at least 99%, or 100%) as compared therewith.

In the fifth aspect, the present invention provides a primer pair, which comprises a first primer and a second primer, wherein the first primer comprises a nucleotide sequence composed of at least 15 consecutive nucleotides (e.g., at least 18; for example, 15-30 consecutive nucleotides, or 18-30 consecutive nucleotides) of the sequence of positions 483-8524 (e.g., positions 8000-8524) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence, and the second primer comprises a nucleotide sequence composed of at least 15 consecutive nucleotides (e.g., at least 18; for example, 15-30 consecutive nucleotides, or 18-30 consecutive nucleotides) of the sequence of positions 8532-9031 (e.g., positions 8532-8800) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, when the first primer and the second primer are used to amplify the sequence shown in SEQ ID NO: 5, an amplicon with a length of 100-500 bp is generated. In certain embodiments, the amplicon has a length of 200-400 bp, such as 250-350 bp, for example about 310 bp.

In certain embodiments, the first primer comprises a nucleotide sequence composed of at least 15 consecutive nucleotides (e.g., at least 18; for example, 15-30 consecutive nucleotides, or 18-30 consecutive nucleotides) of the sequence of positions 8400-8500 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence, and the second primer comprises a nucleotide sequence composed of at least 15 consecutive nucleotides (e.g., at least 18; for example, 15-30 consecutive nucleotides, or 18-30 consecutive nucleotides) of the sequence of positions 8700-8800 of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In certain embodiments, the first primer comprises a nucleotide sequence composed of at least 15 consecutive nucleotides (e.g., at least 18; for example, 15-30 consecutive nucleotides, or 18-30 consecutive nucleotides) of the sequence of positions 8400-8600 (e.g., positions 8400-8500, positions 8450-8550, or positions 8450-8500) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, the second primer comprises a nucleotide sequence composed of at least 15 consecutive nucleotides (e.g., at least 18; for example, 15-30 consecutive nucleotides, or 18-30 consecutive nucleotides) of the sequence of positions 8500-9000 (e.g., positions 8500-8800, positions 8700-8800, or positions 8750-8800) of SEQ ID NO: 5 or the complement thereof, or a sequence having a sequence identity of at least 80% (e.g., 80% to 100%, or 90% to 100%; or at least 85%, at least 90%, at least 95%, at least 99%, or 100%) as compared with the nucleotide sequence.

In some embodiments, the first primer comprises a nucleotide sequence shown in SEQ ID NO: 8 or a sequence having a sequence identity of at least 80% (e.g., 80% to 100%, or 90% to 100%; or at least 85%, at least 90%, at least 95%, at least 99%, or 100%) as compared therewith, and the second primer comprises a nucleotide sequence shown in SEQ ID NO: 9 or a sequence having a sequence identity of at least 80% (e.g., 80% to 100%, or 90% to 100%; or at least 85%, at least 90%, at least 95%, at least 99%, or 100%) as compared therewith.

In a sixth aspect, the present invention provides a method for detecting a nucleic acid molecule unique to corn event 2A-7 in a sample comprising corn nucleic acid, which comprises:
(1) contacting the primer pair according to the fourth or fifth aspect with the sample;
(2) performing a nucleic acid amplification reaction; and
(3) detecting a product of step (2) by gel electrophoresis (e.g., agarose gel electrophoresis);
wherein, the corn event 2A-7 is the corn plant or part, seed, cell or progeny thereof as described in any of the above aspects.

In certain embodiments, the corn event 2A-7 comprises an exogenous nucleic acid molecule encoding mCry1Ab and mCry2Ab inserted into its genome, the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the corn event 2A-7 comprises a sequence as shown in any one of SEQ ID NOs: 1-5 or a complementary sequence thereof in its genome.

In some embodiments, when an expected amplicon is detected in step (3), it indicates that the sample comprises the nucleic acid molecule unique to corn event 2A-7, wherein the expected amplicon refers to an amplicon produced when the primer pair is used to amplify a nucleic acid from the genomic DNA of corn event 2A-7.

In certain embodiments, the method comprises:
(1) contacting the primer pair described in the fourth aspect with the sample;
(2) performing a nucleic acid amplification reaction; and
(3) detecting a product of step (2) by gel electrophoresis (e.g., agarose gel electrophoresis);
wherein, when an amplicon with a length of about 250-260 bp (e.g., about 258 bp) is detected, it indicates the presence of the nucleic acid molecule unique to corn event 2A-7 in the sample.

In some embodiments, the primer pair comprises: a first primer comprising a sequence shown in SEQ ID NO: 6 or a sequence having a sequence identity of at least 80% (e.g., 80% to 100%, or 90% to 100%; or at least 85%, at least 90%, at least 95%, at least 99%, or 100%) as compared therewith, and a second primer comprising a sequence shown in SEQ ID NO: 7 or a sequence having a sequence identity of at least 80% (e.g., 80% to 100%, or 90% to 100%; or at least 85%, at least 90%, at least 95%, at least 99%, or 100%) as compared therewith.

In certain embodiments, the method comprises:
(1) contacting the primer pair described in the fifth aspect with the sample;
(2) performing a nucleic acid amplification reaction; and
(3) detecting a product of step (2) by gel electrophoresis (e.g., agarose gel electrophoresis);
wherein, when an amplicon with a length of about 305-315 bp (e.g., about 310 bp) is detected, it indicates the presence of the nucleic acid molecule unique to corn event 2A-7 in the sample.

In some embodiments, the primer pair comprises: a first primer comprising a sequence shown in SEQ ID NO: 8 or a sequence having a sequence identity of at least 80% (e.g., 80% to 100%, or 90% to 100%; or at least 85%, at least 90%, at least 95%, at least 99%, or 100%) as compared therewith, and a second primer comprising a sequence shown in SEQ ID NO: 9 or a sequence having a sequence identity of at least 80% (e.g., 80% to 100%, or 90% to 100%; or at least 85%, at least 90%, at least 95%, at least 99%, or 100%) as compared therewith.

In a seventh aspect, the present invention provides a method for detecting a nucleic acid molecule unique to corn event 2A-7 in a sample comprising corn nucleic acid, which comprises:
(1) contacting a primer pair with the sample; wherein, when the primer pair is used to amplify a nucleic acid from the genomic DNA of corn event 2A-7, an amplicon comprising a nucleotide sequence selected from the following is generated: a sequence shown in any one of SEQ ID NOs: 1-5 or a complementary sequence thereof;
(2) performing a nucleic acid amplification reaction, thereby producing the amplicon; and
(3) detecting the amplicon;
wherein, the corn event 2A-7 is the corn plant or part, seed, cell or progeny thereof as described in any of the above aspects.

In certain embodiments, the corn event 2A-7 comprises an exogenous nucleic acid molecule encoding mCry1Ab and mCry2Ab inserted into its genome, the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the corn event 2A-7 comprises a sequence shown in any one of SEQ ID NOs: 1-5 or a complementary sequence thereof in its genome.

In some embodiments, in step (3), the detection comprises DNA sequencing.

In some embodiments, in step (3), a nucleic acid probe specific to the amplicon is used to detect the amplicon. In some embodiments, the detection comprises the following steps:
  (a) contacting the nucleic acid probe with an amplification product of step (2);
  (b) subjecting the amplification product and the nucleic acid probe to a stringent hybridization condition; and
  (c) detecting the hybridization between the nucleic acid probe and the amplification product;
  wherein, when the hybridization is detected, it indicates the presence of the nucleic acid molecule unique to corn event 2A-7 in the sample.

In an eighth aspect, the present invention provides a method for detecting the presence of a nucleic acid molecule unique to corn event 2A-7 in a sample comprising corn nucleic acid, which comprises:
  (1) contacting a nucleic acid probe specific to a target sequence with the sample, wherein the target sequence comprises a nucleotide sequence selected from the following: a sequence shown in any one of SEQ ID NOs: 1-5 or a complementary sequence thereof;
  (2) subjecting the sample and the nucleic acid probe to a stringent hybridization condition; and
  (3) detecting the hybridization between the nucleic acid probe and the sample;
  wherein, the corn event 2A-7 is the corn plant or part, seed, cell or progeny thereof as described in any of the above aspects.

In certain embodiments, when the hybridization is detected, it indicates the presence of the nucleic acid molecule unique to corn event 2A-7 in the sample.

In certain embodiments, the corn event 2A-7 comprises an exogenous nucleic acid molecule encoding mCry1Ab and mCry2Ab inserted into its genome, the exogenous nucleic acid molecule is flanked by 5'-flanking region and 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the corn event 2A-7 comprises a sequence shown in any one of SEQ ID NOs: 1-5 or a complementary sequence thereof in its genome.

In some embodiments, the nucleic acid probe comprises: a sequence comprising the 5'-flanking region and a part of the exogenous nucleic acid molecule adjacent thereto, or a sequence having a sequence identity of at least 80% (e.g., 80% to 100%, or 90% to 100%, such as at least 85%, at least 90%, at least 95%, at least 99%, or 100%) as compared therewith.

In some embodiments, the nucleic acid probe has a sequence identity of at least 80% (e.g., 80% to 100%, or 90% to 100%, such as at least 85%, at least 90%, at least 95%, at least 99%, or 100%) as compared with: a sequence shown in SEQ ID NO: 1 or SEQ ID NO: 2 or a complementary sequence thereof or a fragment of either.

In some embodiments, the nucleic acid probe comprises a sequence shown in SEQ ID NO: 1 or 2 or a complementary sequence thereof.

In some embodiments, the nucleic acid probe carries a fluorescence label, for example Taqman probe.

As used herein, the term "primer" refers to an isolated nucleic acid, that is annealed to a complementary target DNA strand by nucleic acid hybridization to form a hybrid between the primer and the target DNA strand, and then extended along the target DNA strand through a polymerase (e.g., a DNA polymerase). Pairs or sets of primers can be used for the amplification of nucleic acid molecule, for example, by polymerase chain reaction (PCR) or other conventional nucleic acid amplification methods.

The term "nucleic acid probe" refers to an isolated nucleic acid attached to a conventional detectable label or reporter molecule, in which the label or reporter molecule is, for example, radioisotope, ligand, chemiluminescent agent, or enzyme. Such probe is complementary to one strand of a target nucleic acid, and in the case of the present invention, hybridizes to one strand of genomic DNA from corn event 2A-7. The probe of the present invention comprises not only deoxyribonucleic acid or ribonucleic acid, but also polyamide and other probe materials that specifically bind to a target DNA sequence and can be used to detect the presence of the target DNA sequence.

Methods of preparing and using probes and primers are described in, for example, Molecular Cloning: A Laboratory Manual, 2nd Edition, Vols 1-3, edited by Sambrook et al., Cold Spring Harbor Laboratory Press, Cold Spring Harbor, NY, 1 989 (hereinafter, "Sambrook et al., 1989"); Current Protocols in Molecular Biology, edited by Ausubel et al., Greene Publishing and Wiley-Interscience, New York, 1992 (with periodic updates) (hereinafter, "Ausubel et al., 1992"); and Innis et al., PCR Protocols: A Guide to Methods and Applications, Academic Press: San Diego, 1990. PCR primer pairs can be obtained from known sequences, for example, by using a computer program intended for this purpose, such as Primer (version 0.5, 1991, Whitehead Institute for Biomedical Research, Cambridge, MA).

The nucleic acid probe and primer of the present invention hybridize with the target DNA sequence under stringent conditions. Any conventional nucleic acid hybridization or amplification method can be used to identify the presence of the DNA of transgenic event in the sample. Herein, if two nucleic acid molecules can form an anti-parallel double-stranded nucleic acid structure, the two molecules are said to be able to specifically hybridize to each other. A nucleic acid molecule is said to be the "complement" of another nucleic acid molecule if they exhibit complete complementarity. In this context, molecules are said to exhibit "complete complementarity" when every nucleotide of one of the molecules is complementary to a nucleotide of the other. Two molecules are said to be "minimally complementary" if they can hybridize to one another with sufficient stability to permit them to remain annealed to one another under at least conventional "low-stringency" conditions. Similarly, the molecules are said to be "complementary" if they can hybridize to one another with sufficient stability to permit them to remain annealed to one another under conventional "high-stringency" conditions. Conventional stringent conditions are described by Sambrook et al., 1989 and Haymes et al., in: Nucleic Acid Hybridization, A Practical Approach, IRL Press, Washington, DC (1985). Therefore, departures from complete complementarity are permissible, as long as such departures do not completely preclude the capacity of the molecules to form a double-stranded structure. In order for a nucleic acid molecule to serve as a primer or probe it need only be sufficiently complementary in sequence to be able to form a stable double-stranded structure under the particular solvent and salt concentrations employed.

Appropriately stringent conditions to promote DNA hybridization, for example 6.0×sodium chloride/sodium citrate (SSC) at about 45° C., followed by washing with 2.0×SSC at 50° C., are known to those skilled in the art, or seen in "Current Protocols in Molecular Biology", John Wiley & Sons, N.Y. (1989), 6.3.1-6.3.6. For example, the salt concentration in the washing step can be selected from a lowly stringent condition of 50° C. and about 2.0×SSC to a highly stringent condition of 50° C. and about 0.2×SSC. In addition, the temperature of the washing step can also be increased from a lowly stringent condition of about 22° C. (room temperature) to a highly stringent condition of about 65° C. Both temperature and salt concentration are variable, or either temperature or salt concentration can be kept constant while changing the other variable. In certain embodiments, the probe or primer of the present invention specifically hybridize to the target sequence under moderately stringent conditions (e.g., about 2.0×SSC and about 65° C.). In certain embodiments, the probe or primer of the invention specifically hybridize to the target sequence under highly stringent conditions.

Appropriate stringency conditions which promote DNA hybridization, for example, 6.0×sodium chloride/sodium citrate (SSC) at about 45° C., followed by a wash of 2.0×SSC at 50° C., are known to those skilled in the art or can be found in Current Protocols in Molecular Biology, John Wiley & Sons, N. Y. (1989), 6.3.1-6.3.6. For example, the salt concentration in the wash step can be selected from a low stringency of about 2.0×SSC at 50° C. to a high stringency of about 0.2×SSC at 50° C. In addition, the temperature in the wash step can be increased from low stringency conditions at room temperature, about 22° C., to high stringency conditions at about 65° C. Both temperature and salt may be varied, or either the temperature or the salt concentration may be held constant while the other variable is changed. In certain embodiments, the probe or primer of the present invention specifically hybridize to the target sequence under moderately stringent conditions (e.g., about 2.0×SSC and about 65° C.). In certain embodiments, the probe or primer of the invention specifically hybridize to the target sequence under highly stringent conditions.

In certain embodiments, the probe of the present invention has a sequence identity of at least 80% (e.g., 80% to 100% or 90% to 100%, for example at least 85%, at least 90%, at least 95%, at least 99%, or 100%) as compared with a nucleic acid sequence shown in SEQ ID NO: 1 or SEQ ID NO: 2 or a complementary sequence thereof or any fragment of either. The hybridization between the probe and the target DNA molecule can be detected by any of various methods known to those skilled in the art. These methods can include, but are not limited to, fluorescent tags, radioactive tags, antibody based tags, and chemiluminescent tags.

Regarding the amplification of a target nucleotide sequence (e.g., by PCR) using a particular amplification primer pair, "stringent conditions" refer to conditions that permit the primer pair to hybridize only to the target nucleic acid sequence (to which a primer having the corresponding wild-type sequence (or its complement) would bind) and preferably to produce a unique amplification product (the amplicon), in a DNA thermal amplification reaction.

The term "specific to (target sequence)" means that a probe or primer hybridizes under stringent hybridization conditions only to the target sequence in a sample comprising the target sequence.

The term "amplicon" refers to the product of nucleic acid amplification of a target nucleic acid sequence that is part of a nucleic acid template. For example, to determine whether the corn plant resulting from a sexual cross contains transgenic event genomic DNA from the corn plant of the present invention, DNA extracted from a corn plant tissue sample may be subjected to nucleic acid amplification method using a primer pair that includes a primer derived from flanking sequence in the genome of the plant adjacent to the insertion site of inserted heterologous DNA, and a second primer derived from the inserted heterologous DNA to produce an amplicon that is diagnostic for the presence of the event DNA. The amplicon is of a length and has a sequence that is also diagnostic for the event. The amplicon may range in length from the combined length of the primer pairs plus one nucleotide base pair, preferably plus about fifty nucleotide base pairs, more preferably plus about two hundred-fifty nucleotide base pairs, and even more preferably plus about four hundred-fifty nucleotide base pairs. Alternatively, a primer pair can be derived from flanking sequence on both sides of the inserted DNA so as to produce an amplicon that includes the entire insert nucleotide sequence. A member of a primer pair derived from the plant genomic sequence may be located a distance from the inserted DNA molecule, this distance can range from one nucleotide base pair up to about twenty thousand nucleotide base pairs. The use of the term "amplicon" specifically excludes primer dimers that may be formed in the DNA thermal amplification reaction.

Nucleic acid amplification can be accomplished by any of the various nucleic acid amplification methods known in the art, including the polymerase chain reaction (PCR). A variety of amplification methods are known in the art and are described, especially, in U.S. Pat. Nos. 4,683,195 and 4,683,202 and in PCR Protocols: A Guide to Methods and Applications, ed. Innis et al., Academic Press, San Diego, 1990. PCR amplification methods have been developed to amplify up to 22 kb of genomic DNA and up to 42 kb of bacteriophage DNA (Cheng et al., Proc. Natl. Acad. Sci. USA 91:5695-5699, 1994). These methods as well as other methods known in the art of DNA amplification may be used in the practice of the present invention. The heterologous DNA insert sequence or flanking sequence from the corn event 2A-7 can be detected by amplifying such sequences from the event using primers derived from the sequences provided herein followed by standard DNA sequencing of the PCR amplicon or of the cloned DNA.

The amplicon produced by these methods may be detected by a plurality of techniques. One such method is Genetic Bit Analysis (Nikiforov, et al. Nucleic Acid Res. 22:4167-4175, 1994) where an DNA oligonucleotide is designed which overlaps both the adjacent flanking genomic DNA sequence and the inserted DNA sequence. The oligonucleotide is immobilized in wells of a microwell plate. Following PCR of the region of interest (using one primer in the inserted sequence and one in the adjacent flanking genomic sequence), a single-stranded PCR product can be hybridized to the immobilized oligonucleotide and serve as a template for a single base extension reaction using a DNA polymerase and labelled ddNTPs specific for the expected next base. Readout may be fluorescent or ELISA-based. A signal indicates presence of the insert/flanking sequence due to successful amplification, hybridization, and single base extension.

Another method is the pyrosequencing technique as described by Winge (Innov. Pharma. Tech. 00:18-24, 2000). In this method an oligonucleotide is designed that overlaps the adjacent genomic DNA and insert DNA junction. The oligonucleotide is hybridized to single-stranded PCR product from the region of interest (one primer in the inserted sequence and one in the flanking genomic sequence) and incubated in the presence of a DNA polymerase, ATP, sulfurylase, luciferase, apyrase, adenosine 5' phospho sulfate and luciferin. dNTP's are added individually and the incorporation results in a light signal which is measured. A light signal indicates the presence of the transgene insert/flanking sequence due to successful amplification, hybridization, and single or multi-base extension.

Fluorescence polarization as described by Chen, et al., (Genome Res. 9:492-498, 1999) is a method that can be used to detect the amplicon of the present invention. Using this method an oligonucleotide is designed which overlaps the genomic flanking and inserted DNA junction. The oligonucleotide is hybridized to single-stranded PCR product from the region of interest (one primer in the inserted DNA and one in the flanking genomic DNA sequence) and incubated in the presence of a DNA polymerase and a fluorescent-labeled ddNTP. Single base extension results in incorporation of the ddNTP. Incorporation can be measured as a change in polarization using a fluorimeter. A change in polarization indicates the presence of the transgene insert/flanking sequence due to successful amplification, hybridization, and single base extension.

Taqman probe method (PE Applied Biosystems, Foster City, CA) is described as a method of detecting and quantifying the presence of a DNA sequence and is fully understood in the instructions provided by the manufacturer. Briefly, a FRET oligonucleotide probe is designed which overlaps the genomic flanking and insert DNA junction. The FRET probe and PCR primers (one primer in the insert DNA sequence and one in the flanking genomic sequence) are cycled in the presence of a thermostable polymerase and dNTPs. Hybridization of the FRET probe results in cleavage and release of the fluorescent moiety away from the quenching moiety on the FRET probe. A fluorescent signal indicates the presence of the flanking/transgene insert sequence due to successful amplification and hybridization.

Molecular Beacons have been described for use in sequence detection as described in Tyangi, et al. (Nature Biotech.14:303-308, 1996) Briefly, a FRET oligonucleotide probe is designed that overlaps the flanking genomic and insert DNA junction. The unique structure of the FRET probe results in it containing secondary structure that keeps the fluorescent and quenching moieties in close proximity. The FRET probe and PCR primers (one primer in the insert DNA sequence and one in the flanking genomic sequence) are cycled in the presence of a thermostable polymerase and dNTPs. Following successful PCR amplification, hybridization of the FRET probe to the target sequence results in the removal of the probe secondary structure and spatial separation of the fluorescent and quenching moieties that results in the production of a fluorescent signal. The fluorescent signal indicates the presence of the flanking/transgene insert sequence due to successful amplification and hybridization.

In the method of any of the above aspects, the sample can be any sample comprising corn event 2A-7 DNA, as long as the sample comprises a polynucleotide (i.e., a polynucleotide unique to corn event 2A-7) that is at least in a detectable amount and can diagnose the presence of event 2A-7 in the sample. In certain embodiments, the sample may be selected from the group consisting of corn ear, corn with husk removed, corn silk, corn pollen, corn grit, corn meal, crushed corn, corn flour, corn oil, corn starch, corn pulp, malted corn, corn sugar, corn syrup, margarine produced from corn oil, unsaturated corn oil, saturated corn oil, corn flakes, popcorn, ethanol and/or liquor produced from corn, distillers dried grains with solubles (DDGS) produced from corn fermentation, and animal feed, cosmetic and filler derived from corn.

The present invention also provides a kit for identifying corn event 2A-7, which comprises the nucleic acid probe and/or primer described above, which specifically hybridize to any one of target sequences shown in SEQ ID NOs: 1-5 under a highly stringent condition. In some embodiments, the kit further comprises other materials necessary for the nucleic acid hybridization or amplification method to be completed.

The present invention also relates to a use of the primer, primer pair, nucleic acid probe or kit as described in any of the above aspects for detecting a nucleic acid molecule unique to corn event 2A-7 in a sample comprising the corn nucleic acid, or a use for detecting the presence of corn event 2A-7.

The present invention also relates to an isolated nucleic acid molecule, which comprises a nucleotide sequence selected from the following: a sequence shown in any one of SEQ ID NOs: 1-5 or a complementary sequence thereof.

Method of Producing Insect-Resistant Corn Plant

In a ninth aspect, the present invention provides a method for producing an insect-resistant corn plant, which comprises:

(1) crossing a first parental corn plant with a second parental corn plant; wherein the first or second parental corn plant is as defined in the first or second aspect;

(2) obtaining first generation progeny plants from the cross of (1); and (3) selecting a progeny plant having insect resistance from these first generation progeny plants, wherein, the progeny plant is an insect-resistant corn plant when the progeny plant satisfies at least one of the following items (3a) to (3c):

(3a) the progeny plant comprises a sequence shown in any one of SEQ ID NOs: 1-5 or a complementary sequence thereof in its genome;

(3b) when SEQ ID NO: 6 and SEQ ID NO: 7 are used as forward primer and reverse primer respectively to amplify the genomic DNA of the progeny plant, an amplicon with a length of about 200-300 bp (e.g., about 258 bp) is generated; and/or, (3c) when SEQ ID NO: 8 and SEQ ID NO: 9 are used as forward primer and reverse primer respectively to amplify the genomic DNA of the progeny plant, an amplicon with a length of about 250-350 bp (e.g., about 310 bp) is generated; or, (3d) when a nucleic acid probe specific to a sequence shown in any one of SEQ ID NOs: 1-5 or a complementary sequence thereof (e.g., a nucleic acid probe comprising a sequence shown in SEQ ID NO: 1 or 2 or a complementary sequence thereof) is used to detect the genomic DNA of the progeny plant, hybridization can be detected.

In certain embodiments, the first or second parental corn plant comprises an exogenous nucleic acid molecule encoding mCry1Ab and mCry2Ab inserted into its genome, the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the first or second parental corn plant comprises a sequence shown in any one of SEQ ID NOs: 1-5 or a complementary sequence thereof in its genome.

In some embodiments, the method further comprises the following steps:
(4) selfing of the progeny plant obtained in step (3) to produce a plurality of second generation progeny plants;
(5) selecting a plant having insect resistance from these second generation progeny plants, wherein the plant is an insect-resistant corn plant when the plant satisfies at least one of items (3a) to (3c).

In a tenth aspect, the present invention provides a method for producing a hybrid corn seed that can grow into an insect-resistant corn plant, which comprises: crossing a first parental corn plant with a second parental corn plant and harvesting the resulting hybrid seed, wherein the first parental corn plant and/or the second parental corn plant are as defined in the first aspect or the second aspect.

In certain embodiments, the first parental corn plant and/or the second parental corn plant comprise an exogenous nucleic acid molecule encoding mCry1Ab and mCry2Ab inserted into its genome, the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the first parental corn plant and/or the second parental corn plant comprise a sequence shown in any one of SEQ ID NOs: 1-5 or a complementary sequence thereof in its genome.

In certain embodiments, the method comprises:
(1) planting seeds of a first inbred corn line, in which the first inbred corn line is a corn plant as defined in the first or second aspect; and planting seeds of a second inbred line with a different genotype;
(2) cultivating corn plants resulting from said planting until time of flowering;
(3) emasculating flowers of plants of one of the corn inbred lines;
(4) sexually crossing the two different inbred lines with each other; and
(5) harvesting the hybrid seed produced thereby.

In certain embodiments, the first inbred corn line comprises an exogenous nucleic acid molecule encoding mCry1Ab and mCry2Ab inserted into its genome, the exogenous nucleic acid molecule is flanked by a 5'-flanking region and a 3'-flanking region, a sequence comprising the 5'-flanking region and a part of the exogenous nucleic acid molecule adjacent thereto is shown in SEQ ID NO: 1, and a sequence comprising the 3'-flanking region and a part of the exogenous nucleic acid molecule adjacent thereto is shown in SEQ ID NO: 2.

In certain embodiments, the first inbred corn line comprises a sequence shown in any one of SEQ ID NOs: 1-5 or a complementary sequence thereof in its genome.

In certain embodiments, the first inbred corn line provides a female parent. In certain embodiments, the first inbred corn line provides a male parent.

In the method of the ninth or tenth aspect, the insect may be one or more selected from lepidopteran insects, for example lepidopteran pests such as armyworm, corn borer (e.g., *Ostrinia furnacalis*), cotton bollworm, peach borer, *Spodoptera frugiperda*, etc.

Those of ordinary skill in the art will recognize that the transgenic genotype of 2A-7 can be introgressed by breeding into other corn lines containing different transgenic genotypes. The resulting seed and progeny plants thereby have the stacked traits which confer upon the plants an increased spectrum of activity.

The transgenic genotype of the present invention can be introgressed into any corn inbreds or hybrids using breeding techniques well known in the art. The goal of plant breeding is to combine different desirable traits in a single variety or hybrid. For field crops, these traits may include resistance to insects and diseases, tolerance to herbicides, tolerance to heat and drought, reducing the time to crop maturity, greater yield, and better agronomic quality. With the mechanical harvesting of many crops, the uniformity of plant characteristics (e.g., germination and stand establishment, growth rate, maturity, as well as height of plants and ears) is important.

Field crops are bred through techniques that utilize plant pollination methods. If pollen from one flower is transferred to the same flower or another flower of the same plant, the plant is self-pollinated. If the pollen comes from a flower of a different plant, the plant is cross-pollinated.

Corn (maize) can be bred by two techniques: self-pollination and cross-pollination. Corn has separate male and female flowers on the same plant, which are located on tassels and ears, respectively. Natural pollination of corn occurs when the wind blows pollen from tassels to the silks protruding from the top of ears.

Reliable methods of controlling male fertility in plants provide opportunities for improved plant breeding. This is especially true for the development of corn hybrids that rely on certain male sterility systems. There are several options available for breeders to control male fertility, such as manual or mechanical emasculation (or detasseling), cytoplasmic male sterility, genetic male sterility, gametocides, etc.

Hybrid corn seeds are typically produced by a male sterility system that incorporates manual or mechanical detasseling.

Alternate strips of two corn inbreds are planted in a field, and the pollen-bearing tassels are removed from one of the inbreds (female). Providing that there is sufficient isolation from sources of foreign corn pollen, the ears of the detasseled inbred will be fertilized only from the other inbred (male), and the resulting seed is therefore hybrid and will form hybrid plants.

The use of male sterile inbreeding is only one factor in the production of corn hybrids. Plant breeding techniques known in the art and used in corn plant breeding programs include, but are not limited to, recurrent selection, backcrossing, pedigree breeding, restriction length polymorphism enhanced selection, genetic marker enhanced selection and transformation.

Definition of Terms

In the present invention, unless otherwise specified, the scientific and technical terms used herein have the meanings commonly understood by those skilled in the art. At the same time, in order to better understand the present invention, definitions and explanations of related terms are provided below.

As used herein, the term "corn" refers to *Zea mays* or maize and includes all plant varieties that can be bred with corn, including wild maize species.

As used herein, the term "Cry2Ab gene" has the meaning well known to those skilled in the art, which is an endotoxin gene found in the insect pathogen *Bacillus thuringiensis* (abbreviated as Bt), and can be found in various public databases (e.g., GenBank: M23724). The codons of Cry2Ab has been optimized by the inventors based on the sequence characteristics of monocotyledonous plants, and a sequence (mCry2Ab) that is particularly suitable for expression in corn cells is thereby obtained. The sequence of mCry2Ab is shown in SEQ ID NO: 13. See also Chinese patent application CN201410483143.2.

As used herein, the term "Cry1Ab gene" has the meaning well known to those skilled in the art, which is an endotoxin gene found in the insect pathogen *Bacillus thuringiensis* (abbreviated as Bt), and can be found in various public databases (e.g., GenBank: M13898). The codons of Cry1Ab has been optimized by the inventors based on the sequence characteristics of monocotyledonous plants, and a sequence (mCry1Ab) that is particularly suitable for expression in corn cells is thereby obtained. The sequence of mCry1Ab is shown in SEQ ID NO: 12. See also Chinese patent application CN201710701976.5.

As used herein, the term "Bar gene" has the meaning well known to those skilled in the art, which is an herbicide resistance gene derived from *Streptomyces hygroscopicus*. The Bar gene is often used as a selection marker, which can produce acetyltransferase, which can acetylate a free amino group of glufosinate herbicide to achieve the purpose of detoxification, thereby facilitating the selection of positive callus in genetic transformation. The sequence of Bar gene sequence is known in the art, for example, see Thompson C J et al., EMBO J. 1987 September; 6(9): 2519-23. In certain exemplary embodiments, the Bar gene has the sequence shown in SEQ ID NO: 14.

As used herein, the terms "corn event", "event" and "transgenic event" are used interchangeably, which refer to a recombinant plant produced by transformation and regeneration of a plant cell or tissue with heterologous DNA (e.g., an expression cassette comprising related gene). The term "event" includes the original transformant and/or the progeny of the transformant which include the heterologous DNA. The term "event" also encompasses progeny produced by sexual outcrossing between the transformant and another corn line. Even after repeated backcrossing to a recurrent parent, the inserted DNA and the flanking DNA from the transformed parent is present in the progeny of the cross at the same chromosomal location. The term "event" also includes DNA from the original transformant, including the insert DNA and the flanking genomic sequence directly adjacent to the insert DNA, which is expected to be transferred to a progeny, said progeny receives the insert DNA containing the relevant transgene as the result of sexual crossing of one parental line comprising the insert DNA (e.g., the original transformant and the progeny produced by selfing) and a parental line that does not contain the insert DNA. Generally, the transformation of plant tissues generates multiple events, each of which represent insertion of a DNA construct into a different location in the genome of a plant cell. Based on the expression of the transgene or other desired characteristics, specific events are selected. Therefore, "event 2A-7", "2A-7" or "2A-7 event" can be used interchangeably.

As used herein, the term "transformation" is the process of introducing a heterologous nucleic acid into a host cell or organism. Specifically, "transformation" refers to the stable integration of a DNA molecule into the genome of related organism.

As used herein, the term "transformed/transgenic/recombinant" refers to a host organism, such as bacteria or plants, into which a heterologous nucleic acid molecule has been introduced. The nucleic acid molecule can be stably integrated into the genome of the host or the nucleic acid molecule can also exist as an extrachromosomal molecule. Such extrachromosomal molecule can replicate automatically. Transformed cells, tissues or plants should be understood to include not only the final product of the transformation process, but also transgenic progeny thereof. A "non-transformed", "non-transgenic", or "non-recombinant" host refers to a wild-type organism, that is, bacteria or plants, which do not contain heterologous nucleic acid molecules. As used herein, "transgenic" refers to that plants, plant cells, or multiple structured or unstructured plant cells, in which these cells have nucleic acid sequences representing related genes that have been integrated into the plant genome through well-known gene manipulation and gene insertion techniques, and typically integrated into a chromosome of a cell nucleus, mitochondria or other organelle containing chromosomes, at a locus different to, or in a number of copies greater than, that normally present in the native plant or plant cell. Transgenic plants are resulted from the manipulation and insertion of such nucleic acid sequence (as opposed to naturally occurring mutations) to produce non-naturally occurring plants or plants with non-naturally occurring genotypes. Transformation techniques for plants and plant cells are well known in the art, and may include, for example, electroporation, microinjection, Agrobacterium-mediated transformation, and ballistic transformation.

As used herein, the expression "unique to corn event 2A-7" refers to distinctively characteristic of corn event 2A-7. Therefore, the nucleic acid unique to event 2A-7 is not found in other non-2A-7 corn plants. In certain embodiments, the nucleic acid unique to event 2A-7 can be selected from SEQ ID NOs: 1-5.

As used herein, the term "genotype" refers to the genetic material inherited from parent corn plants, and not all of which is necessarily expressed in descendant corn plants. Therefore, the expression "2A-7 genotype" refers to the exogenous genetic material transformed into the genome of a plant and a genetic material flanking the inserted sequence in corn event 2A-7.

According to the invention, the term "identity" refers to the match degree between two polypeptides or between two nucleic acids. When two sequences for comparison have the same monomer sub-unit of base or amino acid at a certain site (e.g., each of two DNA molecules has an adenine at a certain site, or each of two polypeptides has a lysine at a certain site), the two molecules are identical at the site. The percent identity between two sequences is a function of the number of identical sites shared by the two sequences over the total number of sites for comparison×100. For example, if 6 of 10 sites of two sequences are matched, these two sequences have an identity of 60%. For example, DNA sequences: CTGACT and CAGGTT share an identity of 50% (3 of 6 sites are matched). Generally, the comparison of two sequences is conducted in a manner to produce maximum identity. Such alignment can be conducted by for example using a computer program such as Align program (DNAstar, Inc.) which is based on the method of Needleman, et al. (J. Mol. Biol. 48:443-453, 1970). The percent identity between two amino acid sequences can also be determined using the algorithm of E. Meyers and W. Miller (Comput. Appl. Biosci., 4:11-17 (1988)) which has been incorporated into the ALIGN program (version 2.0), using a PAM120 weight residue table, and with a gap length penalty of 12 and a gap penalty of 4. In addition, the percentage of identity between two amino acid sequences can be determined by the algorithm of Needleman and Wunsch (J. Mol. Biol. 48:444-453 (1970)) which has been incorporated into the GAP program in the GCG software package (available at http://www.gcg.com), using either a Blossum 62 matrix or a PAM250 matrix, and with a gap weight of 16, 14, 12, 10, 8, 6, or 4 and a length weight of 1, 2, 3, 4, 5, or 6.

Beneficial Effects of the Present Invention

The event 2A-7 provided by the present invention can significantly resist the attack of lepidopteran insect and has good herbicide resistance. Meanwhile, 2A-7 has excellent genetic stability and safety, and equivalent agronomic performance under no insect stress as compared with commercially available varieties (e.g., Zheng 58). The event 2A-7 of the present invention has broad application prospects and realizes positive social and ecological benefits.

SEQUENCE INFORMATION

Information on partial sequences involved in the present invention is provided in Table 1 below.

TABLE 1

| Description of sequence | |
| --- | --- |
| SEQ ID NO: | Description |
| 1 | 5'-junction sequence (a sequence comprising the 5'-flanking region of genome and a part of the exogenous nucleic acid molecule adjacent thereto) |
| 2 | 3'-junction sequence (a sequence comprising the 3'-flanking region of genome and a part of the exogenous nucleic acid molecule adjacent thereto) |
| 3 | 5'-junction sequence + 5'-flanking sequence |
| 4 | 3'-junction sequence + 3'-flanking sequence |
| 5 | Exogenous nucleic acid molecule + flanking sequences at both ends |
| 6 | 5'-forward primer |
| 7 | 5'-reverse primer |
| 8 | 3'-forward primer |
| 9 | 3'-reverse primer |
| 10 | zSSIIb-F |
| 11 | zSSIIb-R |
| 12 | mcry1Ab gene |
| 13 | mcry2Ab gene |
| 14 | Bar gene |
| 15-25 | TAIL-PCR primer |

Deposit of Biological Materials

The present invention relates to the following biological materials that have been deposited in China Common Microbial Culture Collection Center (CGMCC) (No. 3, No. 1, Beichen West Road, Chaoyang District, Beijing):

The Seed of Corn (*Zea mays*) 2A-7, which has the deposit number CGMCC NO. 17848, and the date of deposit is Oct. 28, 2019.

EXAMPLES

The present invention will now be described with reference to the following examples which are intended to illustrate the present invention rather than limit the present invention.

Unless otherwise specified, the experiments and methods described in the examples are basically performed according to conventional methods well known in the art and described in various references. In addition, if the specific conditions are not specified in the examples, it shall be carried out in accordance with the conventional conditions or the conditions recommended by the manufacturer. The reagents or instruments used without the manufacturer's indication are all conventional products that can be purchased commercially. Those skilled in the art know that the present invention is described by way of examples, and are not intended to limit the scope of protection claimed by the present invention. All publications and other references mentioned in this article are incorporated into this article by reference in their entirety.

Example 1. Transformation and Selection of Corn Event 2A-7

Figure 1:
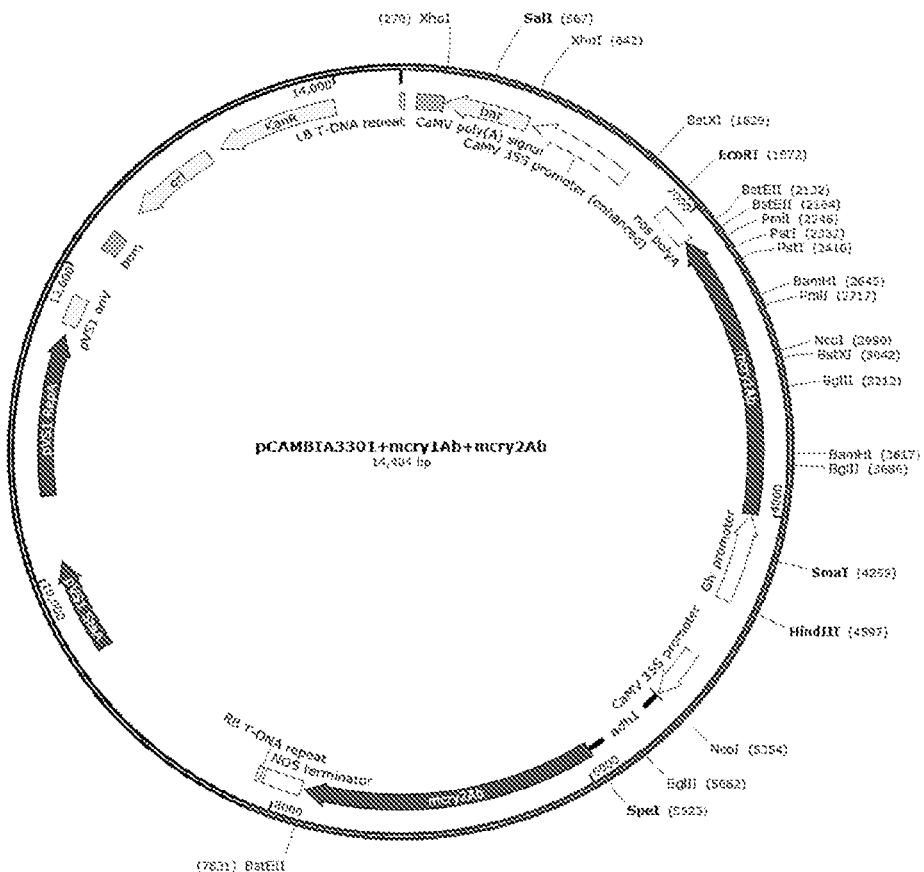
FIG. 1 shows the vector map of pCAMBIA3301+ mCry1Ab+mCry2Ab.

The selective marker gene bar (SEQ ID NO: 14), the target genes mCry1Ab (SEQ ID NO: 12) and mCry2Ab (SEQ ID NO: 13) and their related regulatory elements were inserted into T-DNA of pCAMBIA3301 (purchased from Hunan Fenghui Biotechnology Co., Ltd.) to construct a plant expression vector according to conventional molecular biology methods, which was named as pCAMBIA3301+mCry1Ab+mCry2Ab. The related regulatory elements of each inserted gene were shown in the following table. The map was shown in FIG. 1, wherein the promoter Gly can be seen in Chinese patent application CN201710702435.4. Positive clones were identified by restriction digestion and two-way sequencing, and used for corn transformation.

TABLE 2

Regulatory elements in transformation vector

| Regulatory element | Function | Source |
|---|---|---|
| Gly | Promoter of target gene mcry1Ab | Corn |
| nos | Terminator of target gene mcry1Ab | Agrobacterium tumefaciens |
| CaMV35s | Promoter of target gene mcry2Ab | Cauliflower mosaic virus |
| adh1 | To enhance the expression of mCry2Ab | Corn |
| nos | Terminator of target gene mcry2Ab | Agrobacterium tumefaciens |
| CaMV35s | Promoter of selective marker gene bar | Cauliflower mosaic virus |
| 35S ploy A | Terminator of selective marker gene bar | Cauliflower mosaic virus |

Agrobacterium EHA105 (purchased from Beijing Huayueyang Biotechnology Co., Ltd.) was transformed with the above vector, and then immature embryos of corn were infected with the Agrobacterium containing the target gene. The specific transgenic method was as follows:

The recipient used in the transgenic process was the hybrid F1 generation of inbred lines HiIIA and HiIIB (which can be obtained from the "Corn Genetic Resources Center" (Maize GDB, 2010)). Firstly, the inbred lines HiIIA and HiIIB were planted in the field, and then they were separately covered with bags when the inbred lines shed pollen. Then pollination was prepared by two pollination methods: HiIIA as female parent and HiIIB as male parent; or HiIIA as male parent and HiIIB as female parent. After 9-11 days of pollination, the immature embryo was taken from the kernel of the pollinated ear, and then infected with Agrobacterium indoors. The immature embryo infected with Agrobacterium was placed on a selection medium for multiple screenings to obtain resistant callus, the resistant callus was regenerated into seedlings, thereby obtaining T0 generation transgenic plant. After the T0 generation transgenic plant was obtained, the pollen of the T0 generation transgenic plant was used to cross some seed-bearing female parents, such as Zheng 58. The insertion sequence was introduced into the immature embryo of the recipient plant by the Agrobacterium infection method, and the transgenic plant was obtained after screening with herbicide bialaphos. A total of more than 2,000 T0 generation transformants were obtained through multiple transformations, followed by detecting the amount of proteins mcry1Ab and mcry2Ab, screening the copy number of inserts, testing the stability of successive generations and identifying the agronomic traits in different locations. The corn transformant 2A-7 with high expression of both mcry1Ab and mcry2Ab, single copy, and genetic stability was thereby obtained.

Further, the integration of exogenous DNA in the genome of corn transformant 2A-7 was identified, and the method was as follows: fresh corn leaves were taken to extract corn genomic DNA. TAIL-PCR was performed by using 5 kinds of degenerate primers: LAD1-1, LAD1-2, LAD1-3, LAD1-4, AC1, and 6 kinds of specific primers: RB-0a, RB-1a, RB-2a, LB-0a, LB-1a, LB-2a, and their sequences were shown in the table below.

TABLE 3

Primers used in TAIL-PCR

| Primer | Sequence | SEQ ID NO: |
|---|---|---|
| LAD1-1 | ACGATGGACTCCAGAGCGGCCGCVNVNNNGGAA | 15 |
| LAD1-2 | ACGATGGACTCCAGAGCGGCCGCBNBNNNGGTT | 16 |
| LAD1-3 | ACGATGGACTCCAGAGCGGCCGCVVNVNNNCCAA | 17 |
| LAD1-4 | ACGATGGACTCCAGAGCGGCCGCBDNBNNNCGGT | 18 |
| AC1 | ACGATGGACTCCAGAG | 19 |
| RB-0a | CTGTTGCCGGTCTTGCGATGATTAT | 20 |
| RB-1a | TTCTGTTGAATTACGTTAAGCATGT | 21 |
| RB-2a | GGTTTTTATGATTAGAGTCCCGCAA | 22 |
| LB-0a | CTGCCCGTCACCGAGATTTG | 23 |
| LB-1a | TCCTATAGGGTTTCGCTCATGTGTT | 24 |
| LB-2a | GTACTAAAATCCAGATCCCCCGAAT | 25 |

Note:
N = A/T/C/G, B = G/T/C, V = A/G/C, D = A/G

The PCR product was ligated into B vector (Beijing Quanshijin Biotechnology Co., Ltd. CB101-01), and the ligation product was transformed into E. coli competent cells. Single clones were selected for PCR identification, and the amplified product was sent to Beijing Aoke Dingsheng Biotechnology Co., Ltd. for sequencing. The sequencing results were compared with the T-border sequence and the corn genome, and the integration of exogenous fragments was analyzed.

It was determined that the integration of exogenous DNA resulted in the deletion of part of the sequence in the recipient genome, the deleted sequence was Chr3: 179141695 bp-179141723 bp (B73 reference genome V4 version), with a total of 29 bp. The deletion region was the endogenous corn gene Zm00001d042767, the function of which was predicted to be Glucan endo-13-beta-glucosidase 14. The insertion of the target fragment and the deletion of the sequence of Chr3: 179141695bp-179141723bp would inactivate the function of the gene. Corn has two copies of this gene, and the gene identifier of the other homologous gene is Zm00001d012292. The 2A-7 transformant was inserted between Chr3:179141694bp and 179141724bp (B73 reference genome V4 version), and the sequence of T-border which was integrated into the genome was as shown in the nucleotides 483-8524 of SEQ ID NO: 5, the composition of SEQ ID NO: 5 was shown in the following table. In the 2A-7 genome, the exogenous sequence was flanked by a 5'-flanking region and a 3'-flanking region, the 5'-flanking region had the sequence of nucleotide positions 1-432 of SEQ ID NO: 5, and the 3'-flanking region had the sequence of nucleotide positions 8532-9031 of SEQ ID NO: 5. The 5' junction sequence covering part of the 5'-flanking region and part of the non-genomic sequence is shown in SEQ ID NO: 1 (corresponding to positions 423-442 of SEQ ID NO: 5), the 3' junction sequence covering part of the non-genomic sequence and part of the 3'-flanking region is shown in SEQ ID NO: 2 (corresponding to positions 8522-8541 of SEQ ID NO: 5).

TABLE 4

Sequence information of corn transformant 2A-7 integrated into the genome

| Positions (bp) SEQ in NO ID: 5 | Description of sequence | Length, bp |
|---|---|---|
| 1-432 | 5'-flanking region genome sequence: 1-160 bp referring to the specific genome sequence for recipient corn, 161-432 bp corresponding to corn genome Chr3: 179141995-179141724 bp sequence (B73 genome V4 version) | 432 |
| 433-482 | Unexpected integration fragment | 50 |
| 563-737 | 35S poly A terminator for bar gene | 175 |
| 744-1295 | frame coding for bar gene | 552 |
| 1340-2016 | CAMV 35S promoter (enhanced) for bar gene | 677 |
| 2337-2590 | nos poly A terminator for mCry1Ab gene | 254 |
| 2598-4472 | frame coding for mCry1Ab gene | 1875 |
| 4473-5055 | Gly promoter for mCry1Ab gene | 583 |
| 5458-5803 | promoter for mcry2Ab gene | 346 |
| 5804-6386 | adh1 enhancer | 583 |
| 6393-8294 | expression element for mCry2Ab gene | 1902 |
| 8317-8524 | part sequence of nos polyA terminator for mCry2Ab gene | 208 |
| 8525-8531 | unexpected integration fragment | 7 |
| 8532-9031 | 3'-flanking region genome sequence: corn genome Chr3 179141694-179141195 sequence (B73 genome V4 version) | 500 |

Note:
(1) Unexpected integration sequence was neither genomic sequence nor T-border sequence, and could be a sequence generated by genome repair when the insert was integrated; (2) the positions not mentioned in the table are the intergenic sequence of T-border region.

Preparation of 2A-7 Seed

Through genetic transformation of 3301+mCry1Ab+mCry2Ab vector, T0 generation plants of 2A-7 were obtained. After 2 consecutive generations of selfing, homozygous 2A-7 seeds were obtained, which were deposited in China Common Microbial Culture Collection Center (CGMCC), with the deposit number of CGMCC NO. 17848, and the deposit date of Oct. 28, 2019.

Example 2. Identification of Corn Event 2A-7

1. Materials and Methods 1.1 Extraction of Corn Genomic DNA (1) CTAB solution was taken and subjected to 65° C. water bath in advance;
(2) about 0.1 g of fresh corn leaves was cut into pieces, placed in a pre-cooled mortar, and then quickly ground into powder in liquid nitrogen, and immediately transferred to a pre-cooled 2 mL EP tube (generally no more than ½ tube volume);
(3) 0.8 mL of CTAB buffer incubated at 65° C. was quickly added into the EP tube, gently shaken well, and subjected to water bath at 65° C. for 30 minutes with occasional shaking;
(4) it was placed in a fume hood for about 15 minutes and cooled to room temperature;
(5) an equal volume of mixture of chloroform and isoamyl alcohol (24:1) was added, mixed well, and shaken slightly for 15 min;
(6) centrifugation was performed at 12000 rpm for 8 min at room temperature;
(7) the supernatant was pipetted and transferred to a new 1.5 mL EP tube;
(8) an equal volume of pre-cooled isopropanol (pre-cooled at 4° C.) was added;
(9) centrifugation at 12000 rpm for 8 minutes was performed at room temperature;
(10) the supernatant was discarded, added with 1 mL of 75% ethanol, mixed well, and the supernatant was discarded (i.e., ethanol precipitation);
(11) it was placed in a fume hood until the ethanol was completely volatilized (1-2 h);
(12) the DNA was dissolved with 300 μL of TE Buffer, and stored overnight at 4° C. for later use.

1.2. PCR Method Specific for Transformation Event

The 5'- and 3'-flanking sequences of event 2A-7 were shown as the sequence of nucleotide positions 1-432 and nucleotide positions 8532-9031 of SEQ ID NO: 5, respectively. Forward and reverse primers (Table 5-6) were designed for the 5'-end and 3'-end insertion site sequences of corn transformant 2A-7, to perform PCR reaction. The reaction conditions and reaction system were shown in Table 7-8 below.

TABLE 5

5'-End primer information

| | Primer sequence (5' - 3') | Primer position (bp) | Primer length (bp) | Amplicon (bp) |
|---|---|---|---|---|
| Forward primer 2A-7 5F | CGATCGATGAACGTGAACA AG (SEQ ID NO: 6) | 281-301 | 21 | 258 |
| Reverse primer 2A-7 5R | CAGTACATTAAAAACGTCC GCAAT (SEQ ID NO: 7) | 515-538 | 24 | |

TABLE 6

3'-End primer information

| | Primer sequence (5' - 3') | Primer position (bp) | Primer length (bp) | Amplicon (bp) |
|---|---|---|---|---|
| Forward primer 2A-7 3F | GTTTTTATGATTAGAGTCC CGCAAT (SEQ ID NO: 8) | 8458-8482 | 25 | 310 |
| Reverse primer 2A-7 3R | CAGGATGGGCTTCATGTAC TCC (SEQ ID NO: 9) | 8746-8767 | 22 | |

TABLE 7

PCR reaction conditions

| Stage | Temperature | Time | Cycle |
|---|---|---|---|
| Pre-denaturation | 95° C. | 5 min | — |
| Denaturation | 95° C. | 45 s | 35 |
| Annealing | 58° C. | 45 s | |
| Extension | 72° C. | 30 s | |
| Extension | 72° C. | 10 min | — |
| Preservation | 10° C. | — | — |

TABLE 8

PCR reaction conditions

| Components of reaction system | Final concentration | Volume of each reaction (μL) |
|---|---|---|
| 1. Nuclease-free water | | 12.6 |
| 2. Reaction buffer | 1× | 2 |
| 3. dNTP's | 0.25 mM | 2 |
| 4. Forward primer | 0.25 μmol/L | 0.5 |
| 5. Reverse primer | 0.25 μmol/L | 0.5 |
| 6. DNA polymerase (5 U/μL) | 0.1 U/μL | 0.4 |
| DNA sample (50 ng, 25 ng/μL) | 2.5 ng/μL | 2 |
| Total volume | | 20 |

The endogenous corn gene zSSIIb (Zm00001d052263) was used as the internal reference gene, its forward primer zSSIIb-F was shown in SEQ ID NO: 10, and its reverse primer zSSIIb-R was shown in SEQ ID NO: 11.

Electrophoresis of agarose gel (3%) stained with ethidium bromide was used to detect PCR amplification product. Appropriate molecular weight standards were added during electrophoresis to determine the size of the amplification product, and a gel imaging system was used to make the PCR amplification product visible.

2. Verification Results of the Method

About 1000 ng of genomic DNA extracted from the following samples was used as a template for the PCR amplification of the corn transformant 2A-7 specific system for 5'-end and 3'-end and the internal standard system to determine the specificity of the method: 4 different corn single plants containing transformant 2A-7, corn transformant 2A-5, industrial transgenic corn, industrial transgenic soybean, industrial transgenic cotton, and industrial transgenic rice, wherein:

1) industrial transgenic corns (Bt-11, Bt-176, MON863, MON810, GA21, NK603, T25, TC1507, MON89034, MON88017, 59122, MIR604, 3272, MON87460, mixed as one sample, each with a content of 1%)
2) industrial transgenic soybeans (MON87769, 356043, 305423, CV127, MON89788, A5547-127, A2704-12, mixed as one sample, each with a content of 1%)
3) industrial transgenic rapes (MS1, MS8, RF1, RF2, RF3, T45, Oxy235, Topas19/2, mixed as one sample, each with a content of 1%)
4) industrial transgenic cottons (MON1445, MON531, MON15985, LLCOTTON25, MON88913, mixed as one sample, each with a content of 1%)
5) industrial transgenic rices (KF-6, KMD-1, M12, KF-2, KF-8, mixed as one sample, each with a content of 1%).

Figure 2:
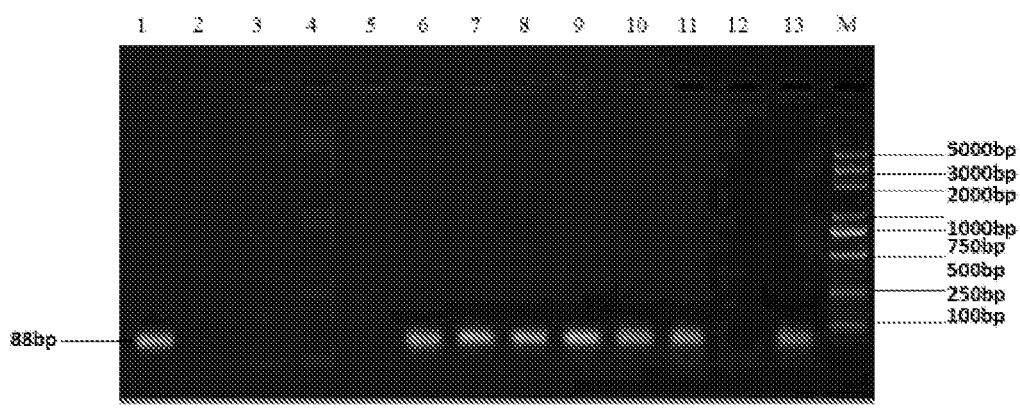
FIG. 2 shows the electrophoresis results of the PCR product of internal reference gene in Example 2. Among them, lane 1: industrial transgenic corn; lane 2: industrial transgenic soybean; lane 3: industrial transgenic rape; lane 4: industrial transgenic cotton; lane 5: industrial transgenic rice; lane 6: transgenic corn 2A-5; lane 7: transgenic corn 2A-7; lane 8: transgenic corn 2A-7; lane 9: transgenic corn 2A-7; lane 10: transgenic corn 2A-7; lane 11: non-transgenic recipient control; lane 12: blank control; lane 13: positive control T+zSSIIb (Zm00001d052263) plasmid (10 pg); lane M: molecular weight marker DL2000 plus.

The test results of the internal reference gene were shown in FIG. 2. The results showed that all corn samples showed expected amplification products, and all non-corn samples did not show any amplification product.

Figure 3:
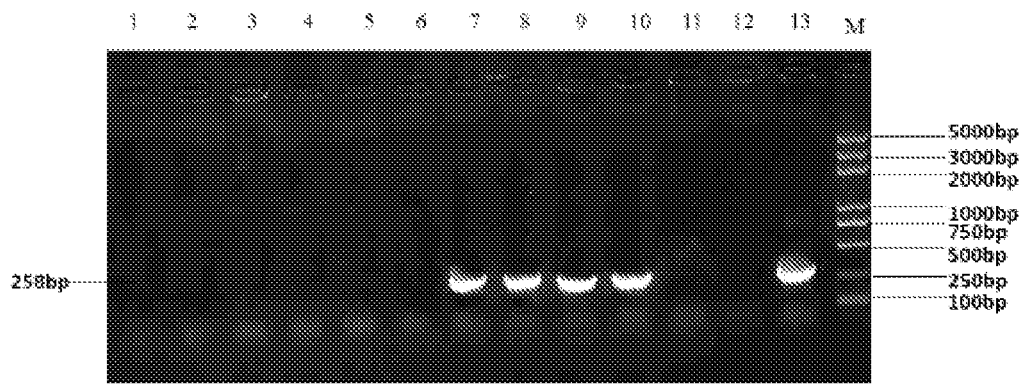
FIG. 3 shows the electrophoresis results of the PCR product of specific reaction system of 5'-flanking region in Example 2. Among them, lane 1: industrial transgenic corn; lane 2: industrial transgenic soybean; lane 3: industrial transgenic rape; lane 4: industrial transgenic cotton; lane 5: industrial transgenic rice; lane 6: transgenic corn 2A-5; lane 7: transgenic corn 2A-7; lane 8: transgenic corn 2A-7; lane 9: transgenic corn 2A-7; lane 10: transgenic corn 2A-7; lane 11: non-transgenic recipient control; lane 12: blank control; lane 13: T+2A-7 5'-plasmid (10 pg) containing the 5'-flanking sequence and insert sequence cloned previously; lane M: molecular weight marker DL2000 plus.

The detection results of amplification using the 5'-end primer pairs shown in Table 5 were shown in FIG. 3. The results showed that for all samples containing transformant 2A-7, a clear single band with expected size was observed without non-specific amplification; for all other corn and non-corn samples, no expected amplification product was observed.

Figure 4:
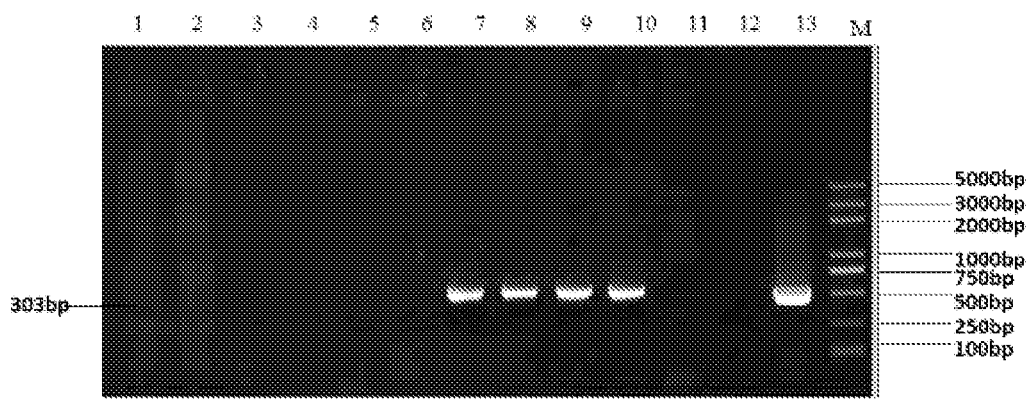
FIG. 4 shows the electrophoresis results of the PCR product of specific reaction system of 3'-flanking region in Example 2. lane 1: industrial transgenic corn; lane 2: industrial transgenic soybean; lane 3: industrial transgenic rape; lane 4: industrial transgenic cotton; lane 5: industrial transgenic rice; lane 6: transgenic corn 2A-5; lane 7: transgenic corn 2A-7; lane 8: transgenic corn 2A-7; lane 9: transgenic corn 2A-7; lane 10: transgenic corn 2A-7; lane 11: non-transgenic recipient control; lane 12: blank control; lane 13: T+2A-7 3'-plasmid plasmid (10 pg) containing the 3'-flanking sequence and insert sequence; lane M: molecular weight marker DL2000 plus.

The detection results of amplification using the 3'-end primer pairs shown in Table 6 were shown in FIG. 4. The results showed that for all samples containing transformant 2A-7, a clear single band with expected size was observed without non-specific amplification; for all other corn and non-corn samples, no expected amplification product was observed.

Because the two primers of specific PCR bound to specific regions of T-DNA and recipient genome respectively, the PCR amplification could be completed only when the two binding regions were adjacent. In the transgenic process, the integration of T-DNA was random, so that except for 2A-7 transformant, the binding regions of other transformants were almost impossible to be adjacent, and even if they were adjacent, the product would not match the expected size. Therefore, the above 5'-end primer pairs and 3'-end primers could be used to detect corn transformant 2A-7.

In addition, in view of the uniqueness of the 5' junction sequence and the 3' junction sequence, a DNA probe that specifically hybridized therewith could also be used to detect the presence of the 5'-junction sequence or 3' junction sequence so as to identify 2A-7 corn event.

Example 3. Identification of Insect Resistance of Corn Event 2A-7 in Field

1. Experimental Basis

The reference basis for this experiment is: "Announcement No. 953 of the Ministry of Agriculture-10.1-2007".

2. Experimental Materials

2.1 Test Corns (1) T5 generation of transgenic insect-resistant corn 2A-7: its selection process comprises infecting the immature embryo of F1 generation of the cross of HiIIA and HiIIB by using *Agrobacterium* containing a target vector; after obtaining a TO generation of transgenic plant, performing crossing and backcrossing by using Zheng as recurrent parent; after obtaining a T3 generation, performing continuous selfing for 2 generations to obtain homozygous 2A-7 with Zheng 58 background;

(2) Zheng 58 as recipient control; and (3) Zhengdan 958, a conventional corn variety for local production and application.

The quality of the above-mentioned materials met the requirements of GB4404.1 not lower than the second grade corn seed.

2.2 Test Insects

*Mythimna separata*: newly hatched larvae of *Mythimna separata* (hatch time 12-24 h) were the population of *Mythimna separata* fed with artificial diet or corn seedlings indoors;

*Ostrinia furnacalis*: newly hatched larvae of *Ostrinia furnacalis* (hatch time 2-12 h) were the population of *Ostrinia furnacalis* artificially bred indoors;

*Helicoverpa armigera*: newly hatched larvae of *Helicoverpa armigera* (hatch time 12-24 h) were the population of *Helicoverpa armigera* artificially bred indoors;

*Spodoptera frugiperda*: newly hatched larvae of *Spodoptera frugiperda* (hatch time 12-24 h) were the population of *Spodoptera frugiperda* artificially bred indoors.

3. Isolation Measures

The isolation of the test plot was carried out in the following way: flowering period should differ by more than 25 days within 300 meters.

4. Experimental Method

Identification of resistance by artificial inoculation with insects: in accordance with the standards of "Announcement No. 953 of the Ministry of Agriculture-10.1-2007".

The field trial design adopted a randomized block design, with 3 replications. The area of each plot was 30 m² (5 m×6 m), the row spacing was 60 cm, the plant spacing was 25 cm. The soil fertility level and tillage management were the same as those in the field production, and no insecticide was sprayed during the whole growth period. There was an interval of 2 m between test plots inoculated with different pests to avoid the spread of pests between different plots. Before and after the inoculation with insects, the field should maintain a certain humidity, and in case of drought, watering should be performed in time.

4.1 *Mythimna separata*

Inoculation with insect: The identification of resistance against *Mythimna separata* was carried out at the leaf stage. When the corn plants developed to the 4-leaf to 6-leaf stage, at least 40 plants were artificially inoculated with insects in each plot. 30-40 newly hatched larvae which were artificially bred were inoculated in corn leaf for each plant. Three days after inoculation, the second inoculation was carried out, the amount of insects and method of inoculation were the same as those in the first inoculation. The inoculation was carried out in the evening.

Investigation record: 14 days after inoculation, the damage of *Mythimna separata* to corn leaves and the number of surviving larvae were surveyed.

Expression of results: According to the damage level of *Mythimna separata* to corn leaves, the average value of damage level (leaf-chewing level) of *Mythimna separata* to corn leaves in each plot was calculated, and its judgment criteria were shown in Table 9. And then the resistance level of transgenic insect-resistant corn to *Mythimna separata* was determined according to the standards set forth in Table 10.

TABLE 9

Grading standards for damage level of *Mythimna separata* to corn leaves

| Leaf-chewing level | Description of symptoms |
| --- | --- |
| 1 | No leaf was damaged, or only leaves had pinprick holes (≤1 mm) |
| 2 | Only few leaves had a few holes in size of bullet hole (≤5 mm) |
| 3 | A few leaves had holes in size of bullet hole (≤5 mm) |
| 4 | Only few leaves had notches (≤10 mm) |
| 5 | A few leaves had notches (≤10 mm) |
| 6 | Several leaves had notches (≤10 mm) |
| 7 | Only few leaves were partially-eaten, and a few leaves had large notches (≤10 mm) |
| 8 | A few leaves were eaten, and several leaves had large notches (≤10 mm) |
| 9 | Most leaves were eaten |

TABLE 10

Evaluation criteria of corn resistance to *Mythimna separata*

| Average value of leaf-chewing level at leaf stage | Resistance grade |
| --- | --- |
| 1.0~2.0 | Highly resistant, HR |
| 2.1~4.0 | Resistant, R |
| 4.1~6.0 | Moderately resistant, MR |
| 6.1~8.0 | Sensitive, S |
| 8.1~9.0 | Highly sensitive, HS |

4.2 *Ostrinia furnacalis*

Inoculation with insect: The identification of resistance to the target pest *Ostrinia furnacalis* was performed in the leaf stage generation and the silking stage generation, in which the artificial inoculation was performed at the leaf stage (small bell-mouth stage, in which corn plant developed to the 8-leaf to 10-leaf stages) and the silking stage respectively. The inoculation was performed twice in each stage. At least 40 plants were artificially inoculated with insects at each plot in each stage, and 60 to 80 newly hatched larvae of *Ostrinia furnacalis* were inoculated for each plant. The insect inoculation was carried out in the evening, and if the weather was worse than moderate rain after insect inoculation, the insect inoculation was carried out again once.

Survey records at the leaf stage: Two to three weeks after the insect inoculation at the leaf stage, the status of middle and upper leaves eaten by *Ostrinia furnacalis* was surveyed plant-by-plant. For each material for identification, 15 to 20 plants/row were randomly selected, and the leaf-chewing level of *Ostrinia furnacalis* was recorded plant-by-plant according to the description in Table 11 (the leaf-chewing level was determined according to the diameter and number of holes on leaves that were formed after the leaves were eaten by *Ostrinia furnacalis* larvae).

TABLE 11

Grading standards for damage level of *Ostrinia furnacalis* to leaves

| Leaf-chewing level | Description of symptoms |
|---|---|
| 1 | Only few leaves had 1~2 holes with a diameter of ≤1 mm |
| 2 | Only few leaves had 3~6 holes with a diameter of ≤1 mm |
| 3 | A few leaves had more than 7 holes with a diameter of ≤1 mm |
| 4 | Few leaves had 1~2 holes with a diameter of ≤2 mm |
| 5 | A few leaves had 3~6 holes with a diameter of ≤2 mm |
| 6 | Several leaves had more than 7 holes with a diameter of ≤2 mm |
| 7 | A few leaves had 1~2 holes with a diameter of >2 mm |
| 8 | Several leaves had 3~6 holes with a diameter of >2 mm |
| 9 | Most leaves had more than 7 holes with a diameter of >2 mm |

The average value of damage level of *Ostrinia furnacalis* to the leaves of the population in the material for identification (leaf-chewing level) was calculated by the following calculation method:

Average leaf-chewing level=Σ(leaf-chewing level× number of plants at this level)/total number of surveyed plants Expression of results of the leaf stage: According to the average value of leaf-chewing level, the damage level of each material for identification was given and shown in Table 12.

TABLE 12

Evaluation criteria of resistance of corn to *Ostrinia furnacalis*

| Damage level | Average leaf-chewing level at leaf stage | Resistance |
|---|---|---|
| 1 | 1.0~2.9 | Highly resistant, HR |
| 3 | 3.0~4.9 | Resistant, R |
| 5 | 5.0~6.9 | Moderately resistant, MR |
| 7 | 7.0~8.9 | Sensitive, S |
| 9 | 9.0 | Highly sensitive, HS |

Survey records at the silking stage: The damage of corn ears, the number of holes, the length of the tunnel bored by the insect (cm), and the instar and number of surviving larvae were surveyed to evaluate the damage degree of ears and the damage of plants.

Expression of results of the silking stage: The evaluation of insect resistance of corn at the silking stage was performed according to the ear damage, the number of holes, the length of the tunnel bored by the insect (cm), the instar and number of surviving larvae; the average value of damage level of *Ostrinia furnacalis* to ears at the silking stage in each plot was calculated, in which the judgment standards were shown in Table 13, and the resistance level of corn at the silking stage to *Ostrinia furnacalis* was determined according to the standards set forth in Table 14.

TABLE 13

Grading standards for damage level of *Ostrinia furnacalis* at the silking stage of corn

| Damage level of ears | Description of symptoms |
|---|---|
| 1 | Ears were not damaged |
| 2 | Less than 50% of the silk was damaged |
| 3 | Most plants had more than 50% of the silk damaged; there were larvae that survived, instar ≤2 |
| 4 | Damaged ear tip was ≤1 cm, there were larvae that survived, instar ≤3 |
| 5 | Damaged ear tip was ≤2 cm; or there were larvae that survived, instar ≤4; tunnel length ≤2 cm |
| 6 | Damaged ear tip was ≤3 cm; or there were larvae that survived, instar ≥4; tunnel length ≤4 cm |
| 7 | Damaged ear tip was ≤4 cm, tunnel length ≤6 cm |
| 8 | Damaged ear tip was ≤5 cm, tunnel length ≤8 cm |
| 9 | Damaged ear tip was >5 cm, tunnel length >8 cm |

TABLE 14

Evaluation criteria for resistance of corn ears to *Ostrinia furnacalis*

| Average damage level of ears | Resistance grade |
|---|---|
| 1.0~2.0 | Highly resistant, HR |
| 2.1~3.0 | Resistant, R |
| 3.1~5.0 | Moderately resistant, MR |
| 5.1~7.0 | Sensitive, S |
| ≥7.1 | Highly sensitive, HS |

4.3 *Helicoverpa armigera*

Inoculation with insect: The identification of resistance to *Helicoverpa armigera* was carried out during the silking and pollen-shedding stage, and each plant was inoculated with 20 to 30 newly hatched larvae. No less than 40 plants were artificially inoculated in each plot, and the inoculation was performed on corn silk. Three days after the inoculation, the second insect inoculation was performed and the number of insects were the same as the first inoculation. The insect inoculation was carried out in the evening, and if the weather was worse than moderate rain after insect inoculation, the insect inoculation was carried out again once.

Investigation of damage degree: The damage rate of ear, the number of surviving larvae per ear, and the damage length of ear were surveyed plant-by-plant on the $14^{th}$ to $21^{st}$ days after artificial inoculation.

Expression of results: The evaluation of insect resistance at the silking stage of corn was carried out according to the damage rate of ear, the number of surviving larvae, and the ear damage length (cm) of ear, and the average value of damage level of *Helicoverpa armigera* to ears at the silking stage of corn in each plot was calculated, in which the judgment criteria were shown in Table 15, and the resistance grade of corn to *Helicoverpa armigera* at the silking stage was determined according to the standards set forth in Table 16.

TABLE 15

Grading standards for damage level of *Helicoverpa armigera* at the silking stage of corn

| Damage level of ears | Description of symptoms |
|---|---|
| 0 | No ear was damaged |
| 1 | Only silk was damaged |
| 2 | Damaged ear tip was 1cm |
| 3+ | For every increase of 1cm in the length of damage under the ear tip, the corresponding damage level increases by 1 level |
| . . . N | |

TABLE 16

Evaluation criteria for resistance of
corn ears to *Helicoverpa armigera*

| Average value of damage level of ears | Resistance grade |
|---|---|
| 0~1.0 | Highly resistant, HR |
| 1.1~3.0 | Resistant, R |
| 3.1~5.0 | Moderately resistant, MR |
| 5.1~7.0 | Sensitive, S |
| ≥7.1 | Highly sensitive, HS |

4.4 *Spodoptera frugiperda*

Inoculation with insect: The identification of resistance to the target pest *Spodoptera frugiperda* was performed in the leaf stage generation and the silking stage generation, in which the artificial inoculation was carried out at the leaf stage (small bell-mouth stage, the corn plant developed to 8-leaf to 10-leaf stages) and the silking stage respectively. The inoculation was carried out twice in each stage, no less than 40 plants was inoculated in each plot in each stage, and 20 to 30 newly hatched larvae of *Spodoptera frugiperda* were inoculated for each plant. The insect inoculation was carried out in the evening, and if the weather was worse than moderate rain after insect inoculation, the insect inoculation was carried out again once.

Survey records: 14 days after the insect inoculation, the damage level of *Spodoptera frugiperda* to corn leaves was surveyed.

Expression of results: According to the damage level of *Spodoptera frugiperda* to corn leaves, the average value of damage level (leaf-chewing level) of *Spodoptera frugiperda* to corn leaves in each plot was calculated, in which the judgment criteria were shown in the following table, and then the resistance grade of transgenic insect-resistant corn to *Spodoptera frugiperda* was determined according to the standards set forth in Table 17 and Table 18.

TABLE 17

Grading standards for damage level of
*Spodoptera frugiperda* to corn leaves

| Leaf-chewing level | Description of symptoms |
|---|---|
| 1 | No leaf was damaged, or only leaves had pinprick wormholes (≤1 mm) |
| 2 | Only few leaves had a few worm holes in size of bullet hole (≤5 mm) |
| 3 | A few leaves had worm holes in size of bullet hole (≤5 mm) |
| 4 | Only few leaves had notches (≤10 mm) |
| 5 | A few leaves had notches (≤10 mm) |
| 6 | Several leaves had notches (≤10 mm) |
| 7 | Only few leaves were partially-eaten, and a few leaves had large notches (≤10 mm) |
| 8 | A few leaves were eaten, and several leaves had large notches (≤10 mm) |
| 9 | Most leaves were eaten |

TABLE 18

Evaluation criteria for resistance of corn to *Spodoptera frugiperda*

| Average value of leaf-chewing level at the leaf stage | Resistance grade |
|---|---|
| 1.0~2.0 | Highly resistant, HR |
| 2.1~4.0 | Resistant, R |
| 4.1~6.0 | Moderately resistant, MR |

TABLE 18-continued

Evaluation criteria for resistance of corn to *Spodoptera frugiperda*

| Average value of leaf-chewing level at the leaf stage | Resistance grade |
|---|---|
| 6.1~8.0 | Sensitive, S |
| 8.1~9.0 | Highly sensitive, HS |

Survey records at the silking stage: the ear damage, the number of holes, the length of the tunnel bored by the insect (cm), and the instar and number of surviving larvae were surveyed to evaluate the damage degree of ears and the damage of plants.

Expression of results of the silking stage: The evaluation of insect resistance of corn at the silking stage was performed according to the ear damage, the number of holes, the length of the tunnel bored by the insect (cm), and the instar and number of surviving larvae; the average value of damage level of *Spodoptera frugiperda* to ears at the silking stage in each plot was calculated, in which the judgment standards were shown in Table 19, and the resistance level of corn at the ear stage to *Spodoptera frugiperda* was determined according to the standards set forth in Table 20.

TABLE 19

Grading standards for damage level of *Spodoptera frugiperda*
at the silking stage of corn

| Damage level of ears | Description of symptoms |
|---|---|
| 1 | Ears were not damaged |
| 2 | Less than 50% of the silk was damaged |
| 3 | Most plants had more than 50% of the silk damaged; there were larvae that survived, instar ≤2 |
| 4 | Damaged ear tip was ≤1 cm, there were larvae that survived, instar ≤3 |
| 5 | Damaged ear tip was ≤2 cm; or there were larvae that survived, instar ≤4; tunnel length ≤2 cm |
| 6 | Damaged ear tip was ≤3 cm; or there were larvae that survived, instar ≥4; tunnel length ≤4 cm |
| 7 | Damaged ear tip was ≤4 cm, tunnel length ≤6 cm |
| 8 | Damaged ear tip was ≤5 cm, tunnel length ≤8 cm |
| 9 | Damaged ear tip was >5 cm, tunnel length >8 cm |

TABLE 20

Evaluation criteria for resistance of
corn ears to *Spodoptera frugiperda*

| Average damage level of ears | Resistance grade |
|---|---|
| 1.0~2.0 | Highly resistant, HR |
| 2.1~3.0 | Resistant, R |
| 3.1~5.0 | Moderately resistant, MR |
| 5.1~7.0 | Sensitive, S |
| ≥7.1 | Highly sensitive, HS |

5. Result Analysis 5.1 Analysis of Identification Results of Resistance to *Mythimna separata*

Figure 5:
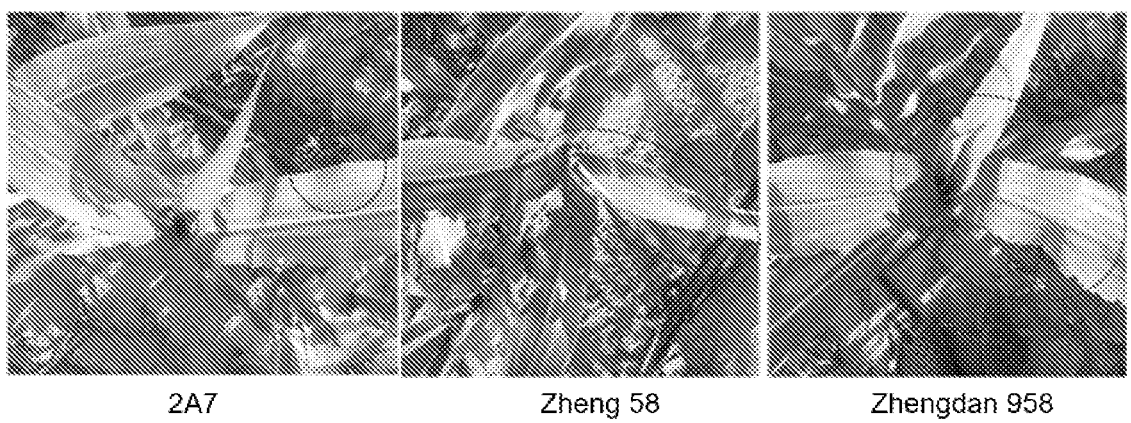
FIG. 5 shows the identification results of the resistance of 2A-7 to *Mythimna separata* in Example 3.

The identification results of insect inoculation were surveyed 2 to 3 weeks after inoculation. The results were shown in FIG. 5 and Table 21. The analysis of leaf damage rate, the size of hole or notch and other parameters showed that, the leaf damage rate and the size of hole or notch of the transgenic corn 2A-7 were all significantly lower than those of the corresponding non-transgenic corn variety and the local common cultivated corn variety, with a significance level of 5%, and the difference reached a significant level. The experimental results showed that the transgenic corn 2A-7 had a better control effect on the target pest *Mythimna separata*.

TABLE 21

Survey results of damage level of *Mythimna separata* to leaves

| Corn variety | Average leaf-chewing level |
|---|---|
| 2A-7 | 1.32a |
| Zheng 58 | 8.03b |
| Zhengdan 958 | 8.52b |

5.2 Analysis of Identification Results of Resistance to *Ostrinia furnacalis*

5.2.1 Survey of Damage Level of Leaves

For the insect inoculation at the leaf stage (V6-V8), the leaf-chewing level was surveyed plant-by-plant 14 days after the inoculation. The survey results of leaf damage level showed that the transgenic corn 2A-7 had a good control effect on the target pest *Ostrinia furnacalis*; the leaf damage level of 2A-7 was significantly lower than that of the corresponding non-transgenic corn variety and the local common cultivated corn variety with a significance level of 5%, and the difference reached a significant level (Table 22). The results showed that the resistance of transgenic corn 2A-7 to *Ostrinia furnacalis* was better than the corresponding non-transgenic corn variety and the local common cultivated corn variety.

TABLE 22

Survey results of damage level of *Ostrinia furnacalis* to leaves at the leaf stage

| Variety | Damage level at the leaf stage | | | |
|---|---|---|---|---|
| | I | II | III | 5% significant level |
| 2A-7 | 1 | 1 | 1 | 1.0 ± 0.00 a |
| Zheng 58 | 8.5 | 8.6 | 8.4 | 8.5 ± 0.08 b |
| Zhengdan 958 | 7.9 | 8.3 | 8.1 | 8.1 ± 0.16 b |

5.2.2 Survey of Damage Level of Ears

Figure 6A:
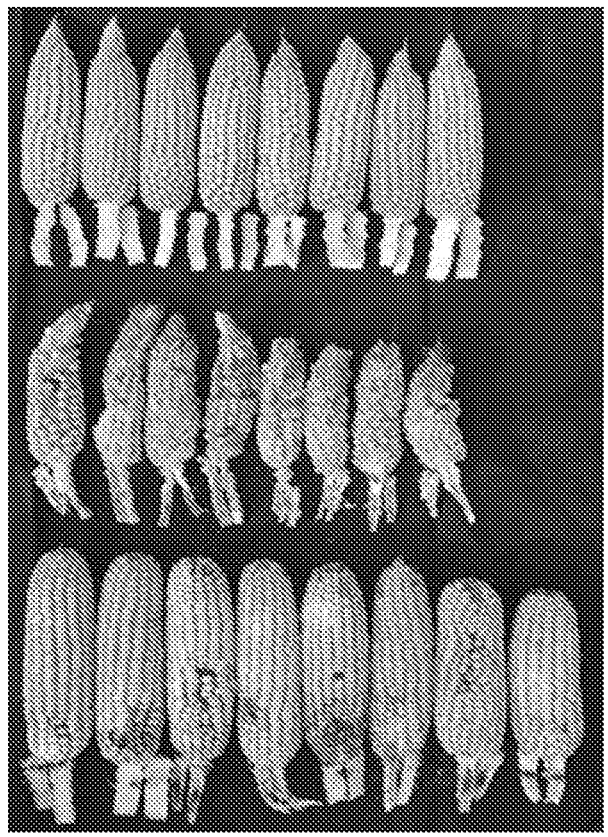
FIG. 6A shows the identification results of the resistance of the ear of 2A-7 to corn borer in Example 3. From top to bottom: 2A-7, Zheng 58, and Zheng Dan 958.
Figure 6B:
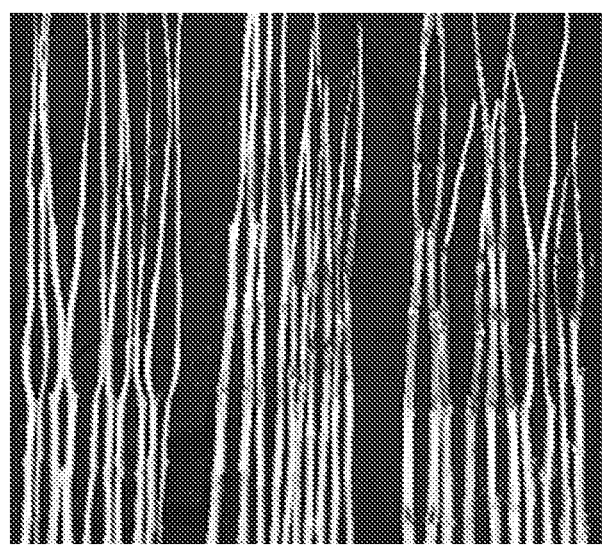
FIG. 6B shows the identification results of the resistance of the stalk of 2A-7 to corn borer in Example 3. From top to bottom: 2A-7, Zheng 58, and Zheng Dan 958.

For the insect inoculation at the silking stage, the identification results of inoculation were surveyed before harvest. The results were shown in FIGS. 6A to 6B and Tables 23-24. The analysis of five parameters including ear damage rate, number of holes per plant, tunnel length per plant, number of surviving insects per plant, and instar of surviving larvae showed that: the ear damage rate, the number of holes per plant, the tunnel length per plant, the number of surviving insects per plant and the instar of surviving larvae of the transgenic corn 2A-7 were all significantly lower than those of the corresponding non-transgenic corn variety and the local common cultivated corn variety with 5% significant level, and the difference reached a significant level. The experimental results showed that the transgenic corn 2A-7 had a better control effect on the target pest *Ostrinia furnacalis*.

TABLE 23

Effects of resistance to *Ostrinia furnacalis* at silking stage

| Variety | Number of holes | Length of tunnel/cm | Number of surviving larvae in each instar/heads | | | | | Total number of surviving larvae/heads | Length of damaged ear tip/cm |
|---|---|---|---|---|---|---|---|---|---|
| | | | 1 instar | 2 instar | 3 instar | 4 instar | 5 instar | | |
| 2A-7 | 0 ± 0.00 | 0 ± 0.00 | 0 ± 0.00 | 0 ± 0.00 | 0 ± 0.00 | 0 ± 0.00 | 0 ± 0.00 | 0 ± 0.00 | 0 ± 0.00 |
| Zheng 58 | 3.20 ± 0.62 | 6.36 ± 1.31 | 0.00 ± 0.00 | 0.00 ± 0.00 | 0.42 ± 0.10 | 1.54 ± 0.31 | 1.79 ± 0.42 | 2.38 ± 0.36 | 4.72 ± 0.91 |
| Zhengdan 958 | 2.92 ± 0.50 | 6.98 ± 1.20 | 0.00 ± 0.00 | 0.00 ± 0.00 | 0.48 ± 0.09 | 1.80 ± 0.23 | 2.93 ± 0.51 | 2.46 ± 0.40 | 4.90 ± 0.86 |

TABLE 24

Survey results of damage level of *Ostrinia furnacalis* to ears

| Variety | Damage level of ears | | | | |
|---|---|---|---|---|---|
| | I | II | III | 5% significant level | Resistance grade |
| 2A-7 | 1 | 1 | 1 | 1.00 ± 0.00 | Highly resistant |
| Zheng 58 | 7.7 | 7.7 | 7.3 | 7.57 ± 0.19 | Highly sensitive |
| Zhengdan 958 | 7.2 | 7.1 | 7.9 | 7.40 ± 0.36 | Highly sensitive |

From the above results, it could be seen that the average ear damage levels of the 2A-7, the control and the main cultivated variety Zhengdan 958 were 1.00, 7.57 and 7.40, respectively. Based on the above data, there were significant differences in the resistance effects of the insect-resistant corn 2A-7 and the two control corns to *Ostrinia furnacalis*, showing a high level of resistance.

5.2.3 Survey of Damage Level of Ear Shank

As the only channel for nutrient transportation in grain fill stage of corn, the ear shank played an important role in the development of kernel. Meanwhile, the ear shank supported the ear during the harvest stage and provided an important guarantee for mechanized harvesting. To this end, we surveyed the parameters including ear shank damage rate, number of surviving larvae on ear shank, length of damaged ear shank (cm). The analysis showed that, the ear shank damage rate, the number of surviving larvae on ear shank and the length of damaged ear shank (cm) of the transgenic corn 2A-7 were all significantly lower than those of the corresponding non-transgenic corn variety and the local common cultivated corn variety with a significant level of 5%, and the difference reached a significant level (Table 25). The experimental results showed that the transgenic corn 2A-7 had a better control effect on the target pest *Ostrinia furnacalis*.

TABLE 25

Insect resistance effect of ear shank on *Ostrinia furnacalis*

| Variety | Ear shank damage rate, % | Number of surviving larvae (heads) | Length of damaged ear shank/cm |
| --- | --- | --- | --- |
| 2A-7 | 0 ± 0.00 | 0 ± 0.00 | 0 ± 0.00 |
| Zheng 58 | 61 ± 5.8 | 2.01 ± 0.15 | 4.21 ± 0.32 |
| Zhengdan 958 | 59 ± 6.2 | 2.23 ± 0.21 | 2.57 ± 0.42 |

5.3 Analysis of Identification Results of Resistance to *Helicoverpa armigera*

Figure 7:
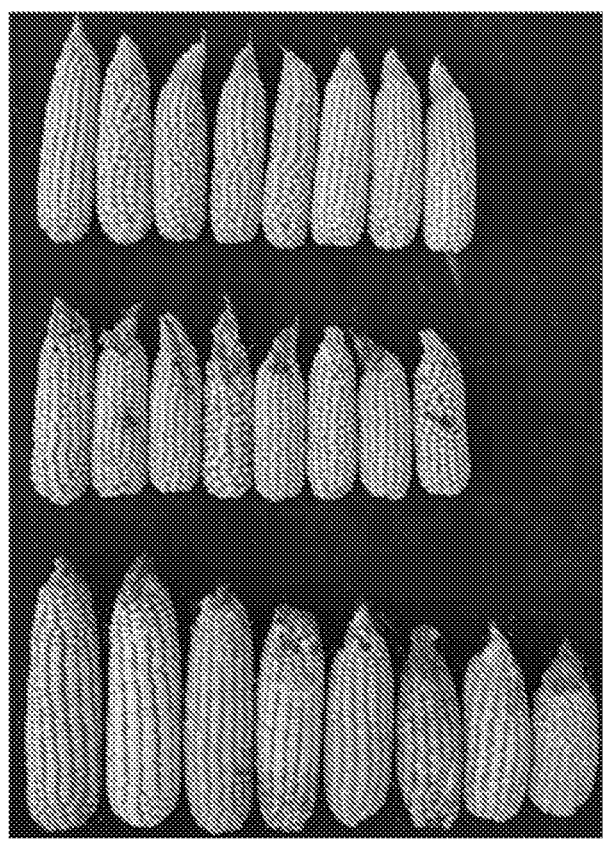
FIG. 7 shows the identification results of the resistance of the ear of 2A-7 to cotton bollworm in Example 3. From top to bottom: 2A-7, Zheng 58, and Zheng Dan 958.

For the insect inoculation in the silking stage, the identification results of insect inoculation were surveyed 2-3 weeks after the insect inoculation. The results were shown in FIG. 7 and Table 26. Analysis of the parameters including ear damage rate, number of surviving larvae, and length of damaged ear (cm) showed that, the ear damage rate, the number of surviving larvae and the length of damaged ear (cm) of the transgenic corn 2A-7 were all significantly lower than those of the corresponding non-transgenic corn variety and the local common cultivated corn variety with a significant level of 5%, and the difference reached a significant level. The experimental results showed that the transgenic corn 2A-7 had a better control effect on the target pest *Helicoverpa armigera*.

TABLE 26

Effects of resistance to *Helicoverpa armigera* at silking stage

| Variety | Ear damage rate, % | Number of surviving larvae (heads) | Length of damaged ear/cm |
| --- | --- | --- | --- |
| 2A-7 | 0 ± 0.00 | 0 ± 0.00 | 0 ± 0.00 |
| Zheng 58 | 86 ± 6.5 | 1.31 ± 0.31 | 6.42 ± 0.98 |
| Zhengdan 958 | 82 ± 7.2 | 1.36 ± 0.42 | 7.06 ± 0.89 |

The above results fully indicated that 2A-7 had significant resistance to the attack of lepidopteran pests including *Ostrinia furnacalis*, *Mythimna separata*, *Helicoverpa armigera* and the like.

5.4 Identification Results of Resistance to *Spodoptera frugiperda*

5.4.1 Survey of Damage Level of Leaves

The insect inoculation was performed at the leaf stage (small bell-mouth stage, corn plants developed to 8-leaf to 10-leaf stages), the inoculation identification results were surveyed 2-3 weeks after the inoculation. The results were shown in Table 27. The analysis of parameters including leaf damage rate, and size of hole or notch showed that, the leaf damage rate and the size of hole or notch of the transformant 2A-7 were all significantly lower than those of the corresponding non-transgenic corn control varieties with 5% significant level, and the difference reached a significant level. The experimental results showed that leaves of the transformant had a good control effect on the target pest *Spodoptera frugiperda*, reaching a high level of resistance.

TABLE 27

Survey results of damage level of *Spodoptera frugiperda* to leaves at leaf stage

| Variety | Damage level at leaf stage | | | 5% significant level |
| --- | --- | --- | --- | --- |
|  | I | II | III |  |
| 2A-7 | 1 | 1 | 1 | 1.0 ± 0.00 a |
| Zheng 58 | 8.3 | 8.4 | 8.8 | 8.5 ± 0.26 b |
| Zhengdan 958 | 8.4 | 8.5 | 8.2 | 8.4 ± 0.15 b |

5.4.2 Survey of Ear Damage Level

For the insect inoculation at the silking stage, the identification results of inoculation were surveyed before harvest. The results were shown in Tables 28 to 29. The analysis of five parameters including ear damage rate, number of holes per plant, tunnel length per plant, number of surviving insects per plant, and instar of surviving larvae showed that, the ear damage rate, the number of holes per plant, the tunnel length per plant, the number of surviving insects per plant and the instar of surviving larvae of the transgenic corn 2A-7 were all significantly lower than those of the corresponding non-transgenic corn variety and the local common cultivated corn variety with a significant level of 5%, and the difference reached a significant level. The experimental results showed that the transgenic corn 2A-7 had a better control effect on the target pest *Spodoptera frugiperda*.

TABLE 28

Effects of resistance to *Spodoptera frugiperda* at silking stage

| Variety | Number of holes | Length of tunnel/cm | Number of surviving larvae in each instar/heads | | | | | Total number of surviving larvae/heads | Length of damaged ear tip/cm |
| --- | --- | --- | --- | --- | --- | --- | --- | --- | --- |
|  |  |  | 1 instar | 2 instar | 3 instar | 4 instar | 5 instar |  |  |
| 2A-7 | 0 ± 0.00 | 0 ± 0.00 | 0 ± 0.00 | 0 ± 0.00 | 0 ± 0.00 | 0 ± 0.00 | 0 ± 0.00 | 0 ± 0.00 | 0 ± 0.00 |
| Zheng 58 | 1.25 ± 0.31 | 8.22 ± 2.21 | 0.00 ± 0.00 | 0.00 ± 0.00 | 0.18 ± 0.04 | 0.34 ± 0.11 | 0.42 ± 0.12 | 0.94 ± 0.16 | 4.96 ± 1.12 |
| Zhengdan 958 | 1.42 ± 0.28 | 8.48 ± 2.11 | 0.00 ± 0.00 | 0.00 ± 0.00 | 0.22 ± 0.09 | 0.29 ± 0.08 | 0.33 ± 0.07 | 0.84 ± 0.13 | 5.21 ± 1.27 |

TABLE 29

Survey results of damage level of *Spodoptera frugiperda* to ears

| Variety | Damage level of ears | | | | |
|---|---|---|---|---|---|
| | I | II | III | 5% significant level | Resistance grade |
| 2A-7 | 1 | 1 | 1 | 1.00 ± 0.00 | Highly resistant |
| Zheng 58 | 7.8 | 7.9 | 7.5 | 7.73 ± 0.21 | Highly sensitive |
| Zhengdan 958 | 8.1 | 8.1 | 7.9 | 8.03 ± 0.12 | Highly sensitive |

Figure 8:
FIG. 8 shows the results of indoor bioassay of the leaf of 2A-7 against *Spodoptera frugiperda* in Example 3. Upper panel: the leaf of control Zheng 58; Lower panel: the leaf of 2A-7.
Figure 9:
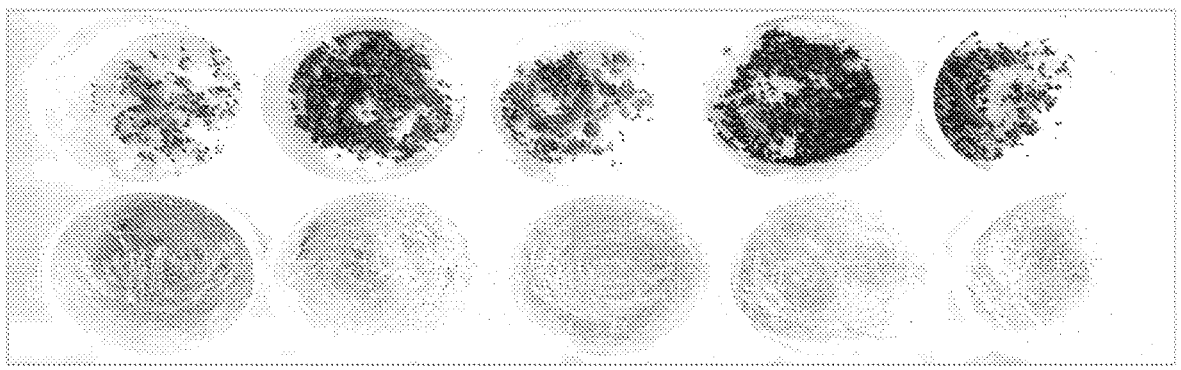
FIG. 9 shows the results of indoor bioassay of the silk of 2A-7 against *Spodoptera frugiperda* in Example 3. Upper panel: the silk of control Zheng 58; Lower panel: the silk of 2A-7.
Figure 10:
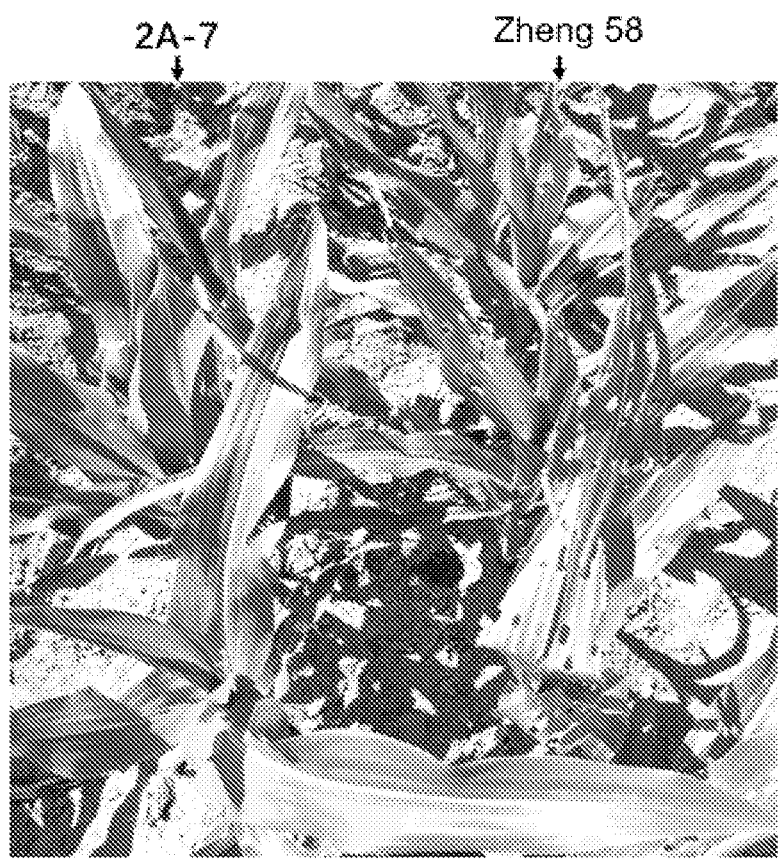
FIG. 10 shows the results of field bioassay of 2A-7 against *Spodoptera frugiperda* in Example 3. Left column: 2A-7; right column: the control Zheng 58.

In addition, FIGS. 8-9 showed the results of indoor bioassays on the resistance of leaves or silks of 2A-7 to *Spodoptera frugiperda*. FIG. 10 showed the results of field bioassays on the resistance of 2A-7 to *Spodoptera frugiperda*.

The above results indicated that the transgenic corn 2A-7 had good resistance to *Spodoptera frugiperda*.

Example 4. Identification of Glufosinate-Ammonium Resistance of Corn Event 2A-7

1. Experimental Scheme

1.1 Experimental Materials

Basta (18% glufosinate-ammonium soluble solution), produced by Bayer.

2A-7: T5 generation of the transformant, same as Example 3.

1.2 Experimental Design (1) Experimental Design

Randomized block design, with 3 to 4 repetitions, was used. An isolation zone with a width of 1.0 m was set between plots, the plot area was not less than 24 m². And the treatment comprised: no herbicide sprayed on transgenic corn; target herbicide sprayed on transgenic corn; no herbicide sprayed on the corresponding non-transgenic corn; target herbicide sprayed on the corresponding non-transgenic corn.

(2) Application Dose of Glufosinate-Ammonium

The application doses of the herbicide used comprised: the medium dose in the pesticide registration label (600 g of active ingredient/ha), 2 times the medium dose (1200 g of active ingredient/ha), and 4 times the medium dose (2400 g of active ingredient/ha). The volume of the added water was 450 L/ha.

1.3 Application Period

The recommended time for glufosinate-tolerant corn was applied.

The postemergence treatment with glufosinate-ammonium on stems and leaves was performed. In general, the resistance identification was performed at the 3-5 leaf stage of corn.

1.4 Requirements for Spray Equipment (1) Selection of Sprayer

A manual knapsack sprayer with constant pressure, wide range of spray and stable flow rate, or a $CO_2$ compression sprayer, should be chosen. Spraying should be evenly.

(2) Nozzle

Fan-shaped nozzles were selected.

(3) Spraying Method

For each treatment, the spraying should be completed at one time. The dosage should be calculated according to the actual area of the sprayed plot. If it rained within 12 hours after the application, the experiment should be performed again.

1.5 Survey of Resistance Identification

The corn seedling rate, plant height, and phytotoxicity symptoms were surveyed and recorded at 1 week, 2 weeks and 4 weeks after the application. 15 corn plants were taken from each plot.

After the corn was harvested, two rows of corn in the middle of each plot were taken to test the yield.

1.6 Analysis and Expression of Results

The damage rate for the herbicide was calculated by the following formula.

$$X = \frac{\Sigma(N \times S)}{T \times M} \times 100$$

wherein:

X: damage rate, with unit of percentage (%);

N: number of damaged plants at same level;

S: level number;

T: total number of plants;

M: the highest level.

The grading of phytotoxicity symptoms was based on GB/T 17980.42-2000.

Level 1: corn grew normally without any damage symptoms;

Level 2: corn was slightly damaged, and the damage rate was less than 10%;

Level 3: corn was moderately damaged, which could be recovered in the future without affecting the yield;

Level 4: corn was relatively severely damaged, which could be difficult to recover, resulting in a reduced yield;

Level 5: corn was severely damaged, which could not be recovered, resulting in a significantly reduced yield or no yield.

2. Experimental Results

2.1 Damage Rate

The damage rate of the transformant was surveyed at 1 week, 2 weeks and 4 weeks after spraying, and the results were shown in the table below.

TABLE 30

| | Treatment | 1 week (%) | 2 weeks (%) | 4 weeks (%) |
|---|---|---|---|---|
| Zheng 58 | Spraying the medium dose | 100.00 ± 0.00 | 100.00 ± 0.00 | 100.00 ± 0.00 |
| Zheng 58 | No spraying | 0.00 ± 0.00 | 0.00 ± 0.00 | 0.00 ± 0.00 |
| 2A-7 | No spraying | 0.00 ± 0.00 | 0.00 ± 0.00 | 0.00 ± 0.00 |
| 2A-7 | Spraying the medium dose | 0.00 ± 0.00 | 0.00 ± 0.00 | 0.00 ± 0.00 |
| 2A-7 | Spraying 2 times the medium dose | 2.75 ± 0.42 | 0.75 ± 0.06 | 0.00 ± 0.00 |
| 2A-7 | Spraying 4 times the medium dose | 15.77 ± 1.55 | 11.65 ± 2.83 | 0.00 ± 0.00 |

Damage rate for glufosinate-ammonium treatment

It could be seen from the above table that there was slightly damaged after spraying 2 times the medium dose of glufosinate-ammonium, and the damage rate was less than 10%. After spraying 4 times the medium dose of glufosinate-ammonium, the transgenic corn 2A-7 was moderately damaged, and the damage rate was greater than 10%.

2.2 Survey of 2A-7 Plant Height

The plant height of the transformant was surveyed at 1 week, 2 weeks and 4 weeks after spraying, and the results were shown in the table below.

TABLE 31

Effect of glufosinate-ammonium treatment on plant height

| | Treatment | 1 week (cm) | 2 weeks (cm) | 4 weeks (cm) |
|---|---|---|---|---|
| Zheng 58 | Spraying the medium dose | — | — | — |
| Zheng 58 | No spraying | 55.50 ± 2.70a | 90.39 ± 3.20b | 171.40 ± 5.92c |
| 2A-7 | No spraying | 56.69 ± 1.19a | 89.27 ± 2.33b | 170.5 ± 6.21c |
| 2A-7 | Spraying the medium dose | 55.76 ± 1.91a | 87.25 ± 2.34b | 165.4 ± 3.95c |
| 2A-7 | Spraying 2 times the medium dose | 52.46 ± 2.93a | 81.17 ± 0.71b | 162.3 ± 7.27c |
| 2A-7 | Spraying 4 times the medium dose | 49.35 ± 0.49a | 77.35 ± 2.53b | 160.1 ± 4.14c |

It can be seen from the above table that the plant height of transgenic corn 2A-7 after spraying with different concentrations of glufosinate ammonium has a small decrease compared with the no spraying control, but there is no significant difference.

2.3 Survey of 2A-7 Yield

The yield and moisture content of kernels of single ear were surveyed at harvest, and the yield per mu (containing 14% moisture) was calculated, and the results were shown in the following table.

TABLE 32

Effect of glufosinate-ammonium treatment on yield

| | Treatment | Kernels of single ear (g) | Moisture content (%) | Equivalent to yield per mu (containing 14% moisture) (kg) |
|---|---|---|---|---|
| Zheng 58 | Spraying the medium dose | — | — | |
| Zheng 58 | No spraying | 70.34 ± 3.87a | 16.20 ± 0.32b | 308.42 ± 16.9c |
| 2A-7 | No spraying | 73.10 ± 4.50a | 16.67 ± 1.25b | 318.75 ± 19.6c |
| 2A-7 | Spraying the medium dose | 72.24 ± 4.25a | 16.29 ± 1.40b | 316.42 ± 18.6c |
| 2A-7 | Spraying 2 times the medium dose | 70.62 ± 4.31a | 16.33 ± 0.93b | 309.18 ± 18.9c |
| 2A-7 | Spraying 4 times the medium dose | 68.56 ± 3.75a | 16.15 ± 0.94b | 300.79 ± 16.4c |

It could be seen from the above table that the yields of the transgenic corn 2A-7 after spraying with different concentrations of glufosinate-ammonium were lower than that of the control without spraying, but there was no significant difference.

Based on the above results, the results of the phytotoxicity symptoms grading according to GB/T 17980.42-2000 were shown in the following table. The transgenic corn 2A-7 grew normally without any damage symptoms after spraying the medium dose of glufosinate-ammonium, and the resistance grade was level 1; after spraying 2 times the medium dose of glufosinate-ammonium, the corn was slightly damaged with a damage rate of less 10%, and the resistance grade was level 2; after spraying 4 times the medium dose of glufosinate-ammonium, the corn was moderately damaged, the plant height could be restored, the yield was lower than that of the treatment group with less dose of spraying, and the resistance grade was level 4. The above results indicated that the 2A-7 had excellent resistance to herbicides such as glufosinate-ammonium.

TABLE 33

Grading of resistance to glufosinate-ammonium

| Material | Treatment | Resistance grade (T3 generation) | Resistance grade (T4 generation) | Resistance grade (T5 generation) |
|---|---|---|---|---|
| Zheng 58 | Spraying the medium dose | 5 | 5 | 5 |
| Zheng 58 | No spraying | — | — | — |
| 2A-7 | No spraying | — | — | — |
| 2A-7 | Spraying the medium dose | 1 | 1 | 1 |
| 2A-7 | Spraying 2 times the medium dose | 2 | 2 | 2 |
| 2A-7 | Spraying 4 times the medium dose | 4 | 4 | 4 |

Although the specific embodiments of the present invention have been described in detail, those skilled in the art will understand that according to all the teachings that have been disclosed, various modifications and substitutions can be made to those details, and these changes are all within the protection scope of the present invention. The full scope of the present invention is given by the appended claims and any equivalents thereof.

What is claimed is:

1. A corn plant or part, seed, cell or progeny thereof, comprising in its genome an inserted exogenous nucleic acid molecule comprising Cry1Ab and Cry2Ab genes, wherein the genome comprises the sequence as set forth in SEQ ID NO: 5.

2. The corn plant or part, seed, cell or progeny thereof according to claim 1, wherein the corn seed that produces the corn plant is deposited in the China General Microbiological Culture Collection Center (CGMCC), with the deposit number CGMCC NO. 17848.

3. A corn seed, which is deposited at the China General Microbiological Culture Collection Center (CGMCC), with the deposit number CGMCC NO. 17848.

4. A product comprising the corn plant or part, seed, cell or progeny thereof according to claim 1, or a corn seed that is deposited at the China General Microbiological Culture Collection Center (CGMCC) with the deposit number CGMCC NO. 17848, wherein the product comprises SEQ ID NO: 5.

5. The product according to claim 4, wherein the product is selected from the group consisting of corn ear, corn with husk removed, corn silk, corn pollen, corn grit, corn meal, crushed corn, corn flour, corn oil, corn starch, corn pulp, malted corn, corn sugar, corn syrup, margarine produced from corn oil, unsaturated corn oil, saturated corn oil, corn flakes, popcorn, ethanol and/or liquor produced from corn, distillers dried grains with solubles (DDGS) produced from corn fermentation, and animal feed, cosmetic and filler derived from corn.

6. The corn plant or part, seed, cell or progeny thereof according to claim 1, wherein the part of the corn plant is selected from the group consisting of kernel, pollen, ovule, flower, shoot, root, stalk, silk, tassel, ear and leaf.

7. A method for producing an insect-resistant corn plant, which comprises:
(a) crossing a first parental corn plant with a second parental corn plant; wherein the first or second parental corn plant is as defined according to claim 1;
(b) obtaining first generation progeny plants from the cross of (a); and
(c) selecting a progeny plant having an insect resistance from these first generation progeny plants, wherein, the progeny plant is an insect-resistant corn plant when the progeny plant satisfies at least one of the following items (i) to (iv):
(i) the progeny plant comprises a sequence shown in SEQ ID NO: 5 in its genome;
(ii) when SEQ ID NO: 6 and SEQ ID NO: 7 are used as forward primer and reverse primer respectively to amplify a genomic DNA of the progeny plant, an amplicon with a length of about 200-300 bp is generated; and/or,
(iii) when SEQ ID NO: 8 and SEQ ID NO: 9 are used as forward primer and reverse primer respectively to amplify a genomic DNA of the progeny plant, an amplicon with a length of about 250-350 bp is generated; or,
(iv) when a nucleic acid probe specific to a sequence shown in SEQ ID NO: 5 is used to detect a genomic DNA of the progeny plant, hybridization is detected;

optionally the method further comprises the following steps:
(d) selfing of the progeny plant obtained in step (c) to produce a plurality of second generation progeny plants;
(e) selecting a plant having an insect resistance from these second generation progeny plants, wherein the plant is an insect-resistant corn plant when the plant satisfies at least one of items (i) to (iv); wherein the insect is selected from Lepidopteran insects.

8. A method for producing a hybrid corn seed that can grow into an insect-resistant corn plant, which comprises: crossing a first parental corn plant with a second parental corn plant and harvesting the resulting hybrid seed, wherein the first parental corn plant and/or the second parental corn plant are as defined in claim 1; wherein the insect is selected from Lepidopteran insects.

9. A method for producing a hybrid corn seed that can grow into an insect-resistant corn plant, which comprises:
(a) planting seeds of a first inbred corn line, in which the first inbred corn line is a corn plant as defined in claim 1; and planting seeds of a second inbred line with a different genotype;
(b) cultivating corn plants resulting from said planting until time of flowering;
(c) emasculating flowers of plants of one of the corn inbred lines;
(d) sexually crossing the two different inbred lines with each other; and
(e) harvesting the hybrid seed produced thereby;
wherein the insect is selected from Lepidopteran insects.

10. The method according to claim 7, wherein the insect is selected from armyworm, corn borer, cotton bollworm, peach borer, and *Spodoptera frugiperda*.

11. The method according to claim 8, wherein the insect is selected from armyworm, corn borer, cotton bollworm, peach borer, and *Spodoptera frugiperda*.

12. The method according to claim 9, wherein the insect is selected from armyworm, corn borer, cotton bollworm, peach borer, and *Spodoptera frugiperda*.

* * * * *

```
                        SEQUENCE LISTING

<160> NUMBER OF SEQ ID NOS: 25

<210> SEQ ID NO 1
<211> LENGTH: 20
<212> TYPE: DNA
<213> ORGANISM: Artificial sequence
<220> FEATURE:
<223> OTHER INFORMATION: 5'-junction sequence

<400> SEQUENCE: 1
ggcagtgggt tgcccacggt                                              20

<210> SEQ ID NO 2
<211> LENGTH: 20
<212> TYPE: DNA
<213> ORGANISM: Artificial sequence
<220> FEATURE:
<223> OTHER INFORMATION: 3'-junction sequence

<400> SEQUENCE: 2
caatccagat ccacgcgcat                                              20

<210> SEQ ID NO 3
<211> LENGTH: 442
<212> TYPE: DNA
<213> ORGANISM: Artificial sequence
<220> FEATURE:
<223> OTHER INFORMATION: 5'-junction sequence + 5'-flanking sequence

<400> SEQUENCE: 3
ttcaaactgg ccctccttaa agagaagata aaaatcggag acctcatatc actagtgacc      60
atagaaaaaa tgagaatttc gtgggtctgt ctgaatatga aattcaattc cacctaggga     120
agggagacac ttccagttcc agtgcgggat tttaccgaac gctaacaatg agcgcctggc     180
gtgcgttaat ttggcagtgt cggcgcagca gaagttcggg atcaactacg ggcagatcgc     240
gaacaatctc ccggacccga cgcaggtggc gaccctcctc cgatcgatga acgtgaacaa     300
ggtgaagctc tacgacgcgg accccgggt gctgacggcg ttcgcgaaca cgggcgtgga     360
gttcatcatc gccgtgggca acgagaacct gcagaccatg gccggcagcc ccgccgcggc     420
gcggcagtgg gttgcccacg gt                                             442

<210> SEQ ID NO 4
<211> LENGTH: 511
```

```
<212> TYPE: DNA
<213> ORGANISM: Artificial sequence
<220> FEATURE:
<223> OTHER INFORMATION: 3'-junction sequence + 3'-flanking sequence

<400> SEQUENCE: 4
gcaatccaga tccacgcgca tcacctgcgt caccgtgggc aacgaggtct tctccggcaa      60
cgacacggcc acgatggcca gcctcctccc cgctatgaag gccgtccacg cggcgctcgc     120
ggacctgggc ctcggcggcc aggccaccgt ctcgtcggcg cactccgtga acgtgctcgc     180
cgccagcttc ccgccgtcgt cgggcgcgtt ccgggaggac ctggcggagt acatgaagcc     240
catcctggac ttccacgccc agacggggtc gccgttcctc atcaacgcct accccttctt     300
cgcgtacaag gcgagcccgg gcagcgtgtc gctgccgtac gtgctgttcg agcccaaccc     360
gggggtgcgc gaccccagca ccggcctcag ctacgacaac atgctgtacg cccagatcga     420
cgccgtgtac gccgccatga aggccatggg gcacacggac gtgggcgtcc ggatctcgga     480
gaccgggtgg ccgtccaggg gcgacgagga c                                    511

<210> SEQ ID NO 5
<211> LENGTH: 9031
<212> TYPE: DNA
<213> ORGANISM: Artificial sequence
<220> FEATURE:
<223> OTHER INFORMATION: Exogenous nucleic acid molecule + flanking
      sequences at both ends

<400> SEQUENCE: 5
ttcaaactgg ccctccttaa agagaagata aaaatcggag acctcatatc actagtgacc      60
atagaaaaaa tgagaatttc gtgggtctgt ctgaatatga aattcaattc cacctaggga     120
agggagacac ttccagttcc agtgcgggat tttaccgaac gctaacaatg agcgcctggc     180
gtgcgttaat ttggcagtgt cggcgcagca gaagttcggg atcaactacg gcagatcgc     240
gaacaatctc ccggacccga cgcaggtggc gaccctcctc cgatcgatga acgtgaacaa     300
ggtgaagctc tacgacgcgg acccccgggt gctgacggcg ttcgcgaaca cgggcgtgga     360
gttcatcatc gccgtgggca acgagaacct gcagaccatg gccggcagcc ccgccgcggc     420
gcggcagtgg gttgcccacg gtgacgcagg tgacgcaggt gatgcgcgtg acggccttc     480
ataacaaatt gacgcttaga caacttaata acacattgcg gacgttttta atgtactgaa     540
ttaacgccga attaattcgg gggatctgga ttttagtact ggatttggt tttaggaatt     600
agaaatttta ttgatagaag tattttacaa atacaaatac atactaaggg tttcttatat     660
gctcaacaca tgagcgaaac cctataggaa ccctaattcc cttatctggg aactactcac     720
acattattat ggagaaactc gagtcaaatc tcggtgacgg gcaggaccgg acggggcggt     780
accggcaggc tgaagtccag ctgccagaaa cccacgtcat gccagttccc gtgcttgaag     840
ccggccgccc gcagcatgcc gcggggggca tatccgagcg cctcgtgcat gcgcacgctc     900
gggtcgttgg gcagcccgat gacagcgacc acgtccttga gcccgtgtgc ctccagggac     960
ttcagcaggt gggtgtagag cgtggagccc agtccgtcc gctggtggcg gggggagacg    1020
tacacggtcg actcggccgt ccagtcgtag gcgttgcgtg ccttccaggg gcccgcgtag    1080
gcgatgccgg cgacctcgcc gtccacctcg gcgacgagcc agggatagcg ctcccgcaga    1140
cggacgaggt cgtccgtcca ctcctgcggt tcctgcggct cggtacggaa gttgaccgtg    1200
cttgtctcga tgtagtggtt gacgatggtg cagaccgccg gcatgccgc ctcggtggca    1260
cggcggatgt cggccgggcg tcgttctggg ctcatggtag actcgagaga gatagatttg    1320
```

```
tagagagaga ctggtgattt cagcgtgtcc tctccaaatg aaatgaactt ccttatatag   1380
aggaagggtc ttgcgaagga tagtgggatt gtgcgtcatc ccttacgtca gtggagatat   1440
cacatcaatc cacttgcttt gaagacgtgg ttggaacgtc ttcttttcc acgatgctcc    1500 tcgtgggtgg gggtccatct ttgggaccac tgtcggcaga ggcatcttga acgatagcct   1560
ttcctttatc gcaatgatgg catttgtagg tgccaccttc cttttctact gtccttttga   1620
tgaagtgaca gatagctggg caatggaatc cgaggaggtt tcccgatatt acccttgtt    1680 gaaaagtctc aatagccctt tggtcttctg agactgtatc tttgatattc ttggagtaga   1740
cgagagtgtc gtgctccacc atgttcacat caatccactt gctttgaaga cgtggttgga   1800
acgtcttctt tttccacgat gctcctcgtg ggtggggtc catctttggg accactgtcg    1860
gcagaggcat cttgaacgat agcctttcct ttatcgcaat gatggcattt gtaggtgcca   1920
ccttcctttt ctactgtcct tttgatgaag tgacagatag ctgggcaatg gaatccgagg   1980
aggtttcccg atattaccct tgttgaaaa gtctcaatag ccctttggtc ttctgagact    2040
gtatctttga tattcttgga gtagacgaga gtgtcgtgct ccaccatgtt ggcaagctgc   2100
tctagccaat acgcaaaccg cctctccccg cgcgttggcc gattcattaa tgcagctggc   2160
acgacaggtt tcccgactgg aaagcgggca gtgagcgcaa cgcaattaat gtgagttagc   2220
tcactcatta ggcaccccag gctttacact ttatgcttcc ggctcgtatg ttgtgtggaa   2280
ttgtgagcgg ataacaattt cacacaggaa acagctatga ccatgattac gaattcgccc   2340
gatctagtaa catagatgac accgcgcgcg ataatttatc ctagtttgcg cgctatattt   2400
tgttttctat cgcgtattaa atgtataatt gcgggactct aatcataaaa acccatctca   2460
taaataacgt catgcattac atgttaatta ttacatgctt aacgtaattc aacagaaatt   2520
atatgataat catcgcaaga ccggcaacag gattcaatct taagaaactt tattgccaaa   2580
tgtttgaacg ggtgacctca cacgccttc tgagccctct ccaggtcgta ctcggcctcg    2640
aaggtcacct cggcgggcac gaactcgatg cggtcgatgt acacctcgtt gccgctgttg   2700
aacacgtggg cgctcagggt gaacacgctg ctgccgttgc tgaagttgaa gggggtggtg   2760
aagcccacgg tgcggaagct gccgctctgc aggttgctgc cgctgctcat ggtggcgctg   2820
aagttgccct ggttgatggg gcggccgtcg atgctggtgt ggaactgcag gttggtggtg   2880
ctggcgtagc ggatgcggac gcggtagcgc tggctcaggg gggcggtgat gttcacgcgc   2940
agggtgctga tctggccggg gctggtgcgg cgcaggatgt cgccgccggt gaagccgggg   3000
cccttcacca cgctggtgcc gctgcccagg ttggtgctct tggtcagggg gatctgggtg   3060
atctggctgc tggggatgat gttgttgaac tcggcggacc tgtggatcca ggagaacatt   3120
ggagccctga tgatgacac ggaggagttg gagaaaccgg acctgaacat ggacacgtgg    3180
gaaagcctgt gggagaaacc ctgccttggt ggcacgttgt tgttctgtgg tggaatctcg   3240
tcaagggagt ccacggtacc ggacttcctg tacacgcgg agggaaggtt ggaggaggta    3300
ccgtaggcga actcggtacc gtcaagcacg gaaagctgct ggttgttgat accgatgttg   3360
aagggcctcc tgtaaagggt ggaggaaagg gtcctgtaca cccctgacc aagctgggcc    3420 acgatcctct gctgtggagc ggcgttaccc atggtaccgt aaagtgggaa ggtgaactcg   3480
ggaccggaga aacccactgg gctggccatg atctggtggc cggaccagta gtactcaccg   3540
cggtgggcgt cggtgtagat ggtgatggag ttaaggatgt ccataaggtg tgggctcctg   3600
atggacccct cgataccctg gcggaaccg cggaaggaac cgtcgaagtt ctcaagcact    3660
```

```
gggttggtgt agatctccct ggtaagctgg gacacggtcc tgatagggta cgtcctggag    3720
tcgtagttag ggaacaggga cacgatgtca agcacggtaa gggtaagctc cctcctgaac    3780
tggttgtacc tgatccagtc cctggagtcg gaccccaca ccctctcaag accggtgttg    3840
taccacctca cggcgtggtc ggtgtagtta ccgataagcc tggtaaggtc gttgtacctg    3900
gagttgatgg tggcggcgtc gaaacccca ctctgaccga acacggacac gtccctaagc    3960
acggaaaggt gaaggttggc ggcctgcacg tacacggaca gcagtggcac ctggtagttc    4020
tgcacggcga acagtgggat ggcggtggta agggcggagt tcatgtcgtt gaactggatc    4080
ctcatctcct ccctaagggc gggattggtg ggatcggcct cccactccct gaaggactcg    4140
gcgtagatct ggtaaaggtt ggaaagaccc tcaagcctgg agatggcctg gttcctggcg    4200
aactcctcga tcctctggtt gataagctgc tcgatctgca caaggaaggc gtcccactgg    4260
gagggaccga agatgcccca gatgatgtcc acaagaccaa gcacgaaacc ggcaccgggc    4320
acgaactcgg aaagaaggaa ctgggtaagg gaaaggggaga tgtcgatggg agtgtaaccg    4380
gtctcgatcc tctcaccacc aagcacctcc acctcgggat tggaaaggca gttgtaggga    4440
atgcactcgt tgatgttggg attgttgtcc atctcgatcc gctcacccac gaacccgaac    4500
cccgagaac ctcacgaacc cgaacccgaa ccggaggggg aggagaagcc aacccacctc    4560
taagaaagca cggagaggga atgcgtcccc cgcagcgtct ttatagccga gcgcggggcc    4620
gccgcggccg tcctgatccc atccgacggc gcggacgccc agtggaatat gcggggcatc    4680
ggggtcgcca ccgcgctacg agcacacgag cacctcccgg ggacggcttt gttgggaccc    4740
ggagcaggac gggagcgtga ggcggggccc agcgtgactg acctgacctc gttttggccg    4800
ctgcactgcc ggcctgtgca ggccaccgaa aaatatctcg cgtggcgaaa tgccatcctt    4860
gccctcggga gcacacggat cggacggcaa gcggtcgtcg ggtcgggtgg tggatatgga    4920
cacttgctga tgacgtgggt ccacgatggc agtgggcgaa gccaagtcca cgcgtcacag    4980
tgaccgcacc tagtgctcaa aaacgacgga tcggatagga acgaatacat gtcacaattc    5040
actaccttgt aatctaagct tggcactggc cgtcgtttta caacgtcgtg actgggaaaa    5100
ccctggcgtt acccaactta atcgccttgc agcacatccc cctttcgcca gctggcgtaa    5160
tagcgaagag gcccgcaccg atcgcccttc ccaacagttg cgcagcctga atggcgaatg    5220
ctagagcagc ttgagcttgg atcagattgt cgtttcccgc cttcagttta gcttcatgga    5280
gtcaaagatt caaatagagg acctaacaga actcgccgta aagactggcg aacagttcat    5340
acagagtctc ttacgactca atgacaagaa gaaaatcttc gtcaacatgg tggagcacga    5400
cacacttgtc tactccaaaa atatcaaaga tacagtctca gaagaccaaa gggcaattga    5460
gactttcaa caagggtaa tatccggaaa cctcctcgga ttccattgcc cagctatctg    5520
tcactttatt gtgaagatag tggaaaagga aggtggctcc tacaaatgcc atcattgcga    5580
taaaggaaag gccatcgttg aagatgcctc tgccgacagt ggtcccaaag atggaccccc    5640
acccacgagg agcatcgtgg aaaaagaaga cgttccaacc acgtcttcaa agcaagtgga    5700
ttgatgtgat atctccactg acgtaaggga tgacgcacaa tcccactatc cttcgcaaga    5760
cccttcctct atataaggaa gttcatttca tttggagaga acgcggggga ctcttgacca    5820
tgggatcaag tgcaaaggtc cgccttgttt ctcctctgtc tcttgatctg actaatcttg    5880
gtttatgatt cgttgagtaa ttttggggaa agctagcttc gtccacagtt ttttttcga    5940
tgaacagtgc cgcagtggcg ctgatcttgt atgctatcct gcaatcgtgg tgaacttatt    6000
tcttttatat ccttcactcc catgaaaagg ctagtaatct ttctcgatgt aacatcgtcc    6060
```

```
agcactgcta ttaccgtgtg gtccatccga cagtctggct gaacacatca tacgatattg   6120
agcaaagatc tatcttccct gttctttaat gaaagacgtc attttcatca gtatgatcta   6180
agaatgttgc aacttgcaag gaggcgtttc tttctttgaa tttaactaac tcgttgagtg   6240
gccctgtttc tcggacgtaa ggcctttgct gctccacaca tgtccattcg aattttaccg   6300
tgtttagcaa gggcgaaaag tttgcatctt gatgatttag cttgactatg cgattgcttt   6360
cctggacccg tgcagctgcg gtggcaacta gtatgaactc cgtcctcaac agcggccgca   6420
ccaccatctg cgacgcctac aacgtggccg cccacgaccc cttctccttc cagcacaagt   6480
ccctggacac cgttcagaag gagtggaccg agtggaagaa gaacaaccac agcctgtacc   6540
tcgaccccat cgtcggcacc gtggcctcct cctgctgaa gaaggtcggc tccctcgtcg   6600
gcaagcgtat cctgtccgag ctgcgcaacc tcatcttccc cagcggcagc accaacctga   6660
tgcaggacat cctgcgcgag accgagaagt tcctcaacca gaggctgaac accgacaccc   6720
tggctcgcgt gaacgccgag ctgaccggcc tccaggccaa cgtcgaggag ttcaaccgcc   6780
aggtggacaa cttcctgaac cccaaccgta acgccgtccc cctctccatc acctcctccg   6840
tcaacaccat gcagcagctg ttcctgaacc gcctccccca gttccagatg cagggctacc   6900
agctgctcct gctgcccctc ttcgcccagg ctgccaacct gcacctgtcc ttcatcaggg   6960
acgtcatcct caacgccgac gagtggggca tcagcgccgc cacctgcgc acctaccgcg   7020 actacctgaa gaactacacc cgcgactact ccaactactg catcaacacc taccagagcg   7080
ctttcaaggg cctcaacacc cgtctgcacg acatgctgga gttcaggacc tacatgttcc   7140
tcaacgtgtt cgagtacgtg tccatctggt ccctgttcaa gtaccagagc ctgctcgtct   7200
cctccggcgc caacctgtac gccagcggct ccggccccca gcagacccag agcttcacct   7260
cccaggactg gccctccctg tactccctct tccaggtcaa ctccaactac gtcctgaacg   7320
gcttcagcgg cgccccgcctg agcaacacct ccccaacat cgtcggcctc cccggctcca   7380
ccaccaccca cgccctgctg gctgcccgcg tgaactactc cggcggcatc tcctccggcg   7440
acatcggcgc cagcccccttc aaccagaact tcaactgctc caccttcctc cccccctgc   7500 tgaccccctt cgtgcgctcc tggctcgact ccggctccga ccgcgagggc gtcgccaccg   7560
tcaccaactg gcagaccgag agcttcgaga ccaccctggg cctgaggtcc ggcgccttca   7620
ccgctcgtgg caacagcaac tacttccccg actacttcat ccgcaacatc tccggcgtcc   7680
ccctcgtcgt gcgcaacgag gacctgcgca ggccctgca ctacaacgag atccgcaaca   7740
tcgcctcccc cagcggcacc cccggcggcg cccgtgccta catggtgtcc gtccacaacc   7800
gcaagaacaa catccacgcc gtccacgaga acggctccat gatccacctc gctcccaacg   7860
actacaccgg cttcaccatc agccccatcc acgccaccca ggtcaacaac cagacccgca   7920
ccttcatctc cgagaagttc ggcaaccagg gcgacagcct gaggttcgag cagaacaaca   7980
ccaccgcccg ctacccctg cgcggcaacg gcaactccta caacctctac ctgcgtgtgt   8040
cctccatcgg caacagcacc atccgcgtca ccatcaacgg cagggtgtac accgccacca   8100
acgtcaacac caccaccaac aacgacggcg tcaacgacaa cggcgcccgc ttcagcgaca   8160
tcaacatcgg caacgtggtc gcttcctcca actccgacgt cccccctggac atcaacgtga   8220 ccctcaactc cggcacccag ttcgacctga tgaacatcat gctggtcccc accaacatca   8280
gccccctcta ctaaggtgac cagctcgaat tccccgatc gttcaaacat ttggcaataa   8340
agtttcttaa gattgaatcc tgttgccggt cttgcgatga ttatcatata atttctgttg   8400
```

```
aattacgtta agcatgtaat aattaacatg taatgcatga cgttatttat gagatgggtt    8460
tttatgatta gagtcccgca attatacatt taatacgcga tagaaaacaa aatatagcgc    8520
gcaatccaga tccacgcgca tcacctgcgt caccgtgggc aacgaggtct tctccggcaa    8580
cgacacggcc acgatggcca gcctcctccc cgctatgaag gccgtccacg cggcgctcgc    8640
ggacctgggc ctcggcggcc aggccaccgt ctcgtcggcg cactccgtga acgtgctcgc    8700
cgccagcttc ccgccgtcgt cgggcgcgtt ccgggaggac ctggcggagt acatgaagcc    8760
catcctggac ttccacgccc agacggggtc gccgttcctc atcaacgcct accccttctt    8820
cgcgtacaag gcgagcccgg gcagcgtgtc gctgccgtac gtgctgttcg agcccaaccc    8880
gggggtgcgc gaccccagca ccggcctcag ctacgacaac atgctgtacg cccagatcga    8940
cgccgtgtac gccgccatga aggccatggg gcacacggac gtgggcgtcc ggatctcgga    9000
gaccgggtgg ccgtccaggg gcgacgagga c                                   9031
```

<210> SEQ ID NO 6
<211> LENGTH: 21
<212> TYPE: DNA
<213> ORGANISM: Artificial sequence
<220> FEATURE:
<223> OTHER INFORMATION: 5'-forward primer

<400> SEQUENCE: 6
cgatcgatga acgtgaacaa g                                              21

<210> SEQ ID NO 7
<211> LENGTH: 24
<212> TYPE: DNA
<213> ORGANISM: Artificial sequence
<220> FEATURE:
<223> OTHER INFORMATION: 5'-reverse primer

<400> SEQUENCE: 7
cagtacatta aaaacgtccg caat                                           24

<210> SEQ ID NO 8
<211> LENGTH: 25
<212> TYPE: DNA
<213> ORGANISM: Artificial sequence
<220> FEATURE:
<223> OTHER INFORMATION: 3'-forward primer

<400> SEQUENCE: 8 gttttttatga ttagagtccc gcaat                                         25

<210> SEQ ID NO 9
<211> LENGTH: 22
<212> TYPE: DNA
<213> ORGANISM: Artificial sequence
<220> FEATURE:
<223> OTHER INFORMATION: 3'-reverse primer

<400> SEQUENCE: 9
caggatgggc ttcatgtact cc                                             22

<210> SEQ ID NO 10
<211> LENGTH: 21
<212> TYPE: DNA
<213> ORGANISM: Artificial sequence
<220> FEATURE:
<223> OTHER INFORMATION: zSSIIb-F

<400> SEQUENCE: 10
cggtggatgc taaggctgat g                                                 21

<210> SEQ ID NO 11
<211> LENGTH: 23
<212> TYPE: DNA
<213> ORGANISM: Artificial sequence
<220> FEATURE:
<223> OTHER INFORMATION: zSSIIb-R

<400> SEQUENCE: 11
aaagggccag gttcattatc ctc                                               23

<210> SEQ ID NO 12
<211> LENGTH: 1875
<212> TYPE: DNA
<213> ORGANISM: Artificial sequence
<220> FEATURE:
<223> OTHER INFORMATION: mcry1Ab gene

<400> SEQUENCE: 12
tcacacggcc ttctgagccc tctccaggtc gtactcggcc tcgaaggtca cctcggcggg        60
cacgaactcg atgcggtcga tgtacacctc gttgccgctg ttaacacgt gggcgctcag       120 ggtgaacacg ctgctgccgt tgctgaagtt gaaggggtg gtgaagccca cggtgcggaa       180
gctgccgctc tgcaggttgc tgccgctgct catggtggcg ctgaagttgc cctggttgat       240
ggggcggccg tcgatgctgg tgtggaactg caggttggtg gtgctggcgt agcggatgcg       300
gacgcggtag cgctggctca gggggcggt gatgttcacg cgcagggtgc tgatctggcc       360
ggggctggtg cggcgcagga tgtcgccgcc ggtgaagccg ggccccttca ccacgctggt       420
gccgctgccc aggttggtgc tcttggtcag ggggatctgg gtgatctggc tgctggggat       480
gatgttgttg aactcggcgg acctgtggat ccaggagaac attggagccc tgatgatgga       540
cacggaggag ttggagaaac cggacctgaa catggacacg tgggaaagcc tgtgggagaa       600
accctgcctt ggtggcacgt tgttgttctg tggtggaatc tcgtcaaggg agtccacggt       660
accggacttc ctgtacacgg cggagggaag gttggaggag gtaccgtagg cgaactcggt       720
accgtcaagc acggaaagct gctggttgtt gataccgatg ttgaagggcc tcctgtaaag       780
ggtggaggaa agggtcctgt acacaccctg accaagctgg ccacgatccc tctgctgtgg       840
agcggcgtta cccatggtac cgtaaagtgg gaaggtgaac tcgggaccgg agaaacccac       900
tgggctggcc atgatctggt ggccggacca gtagtactca ccgcggtggg cgtcggtgta       960
gatggtgatg gagttaagga tgtccataag gtgtgggctc tgatggacc cctcgatacc      1020 ctgggcggaa ccgcggaagg aaccgtcgaa gttctcaagc actgggttgg tgtagatctc      1080
cctggtaagc tggacacggg tcctgatagg gtacgtcctg gagtcgtagt tagggaacag      1140
ggacacgatg tcaagcacgg taagggtaag ctccctcctg aactggttgt acctgatcca      1200
gtccctggag tcgggacccc acaccctctc aagaccggtg ttgtaccacc tcacggcgtg      1260
gtcggtgtag ttaccgataa gcctggtaag gtcgttgtac ctggagttga tggtggcggc      1320
gtcgaaaccc cacctctgac cgaacacgga cacgtcccta agcacggaaa ggtgaaggtt      1380
ggcggcctgc acgtacacgg acagcagtgg cacctggtag ttctgcacgg cgaacagtgg      1440
gatggcggtg gtaagggcgg agttcatgtc gttgaactgg atcctcatct cctccctaag      1500
ggcgggattg gtgggatcgg cctcccactc cctgaaggac tcggcgtaga tctggtaaag      1560
gttggaaaga ccctcaagcc tggagatggc ctggttcctg gcgaactcct cgatcctctg      1620

| | |
|---|---|
| gttgataagc tgctcgatct gcacaaggaa ggcgtcccac tgggagggac cgaagatgcc | 1680 |
| ccagatgatg tccacaagac caagcacgaa accggcaccg ggcacgaact cggaaagaag | 1740 |
| gaactgggta agggaaaggg agatgtcgat gggagtgtaa ccggtctcga tcctctcacc | 1800 |
| accaagcacc tccacctcgg gattggaaag gcagttgtag ggaatgcact cgttgatgtt | 1860 |
| gggattgttg tccat | 1875 |

<210> SEQ ID NO 13
<211> LENGTH: 1902
<212> TYPE: DNA
<213> ORGANISM: Artificial sequence
<220> FEATURE:
<223> OTHER INFORMATION: mcry2Ab gene

<400> SEQUENCE: 13

| | |
|---|---|
| atgaactccg tcctcaacag cggccgcacc accatctgcg acgcctacaa cgtggccgcc | 60 |
| cacgacccct tctccttcca gcacaagtcc ctggacaccg ttcagaagga gtggaccgag | 120 |
| tggaagaaga acaaccacag cctgtacctc gaccccatcg tcggcaccgt ggcctccttc | 180 |
| ctgctgaaga aggtcggctc cctcgtcggc aagcgtatcc tgtccgagct gcgcaacctc | 240 |
| atcttcccca gcggcagcac caacctgatg caggacatcc tgcgcgagac cgagaagttc | 300 |
| ctcaaccaga ggctgaacac cgacaccctg gctcgcgtga acgccgagct gaccggcctc | 360 |
| caggccaact cgaggagtt caaccgccag gtggacaact tcctgaaccc caaccgtaac | 420 |
| gccgtccccc tctccatcac ctcctccgtc aacaccatgc agcagctgtt cctgaaccgc | 480 |
| ctcccccagt tccagatgca gggctaccag ctgctcctgc tgcccctctt cgcccaggct | 540 |
| gccaacctgc acctgtcctt catcagggac gtcatcctca cgccgacga gtggggcatc | 600 |
| agcgccgcca ccctgcgcac ctaccgcgac tacctgaaga actacaccg cgactactcc | 660 |
| aactactgca tcaacaccta ccagagcgct ttcaagggcc tcaacacccg tctgcacgac | 720 |
| atgctggagt tcaggaccta catgttcctc aacgtgttcg agtacgtgtc catctggtcc | 780 |
| ctgttcaagt accagagcct gctcgtctcc tccggcgcca acctgtacgc cagcggctcc | 840 |
| ggccccagc agacccagag cttcacctcc caggactggc ccttcctgta ctccctcttc | 900 |
| caggtcaact ccaactacgt cctgaacggc ttcagcggcg cccgcctgag caacaccttc | 960 |
| cccaacatcg tcggcctccc cggctccacc accaccacg ccctgctggc tgcccgcgtg | 1020 |
| aactactccg gcggcatctc ctccggcgac atcggcgcca gcccttcaa ccagaacttc | 1080 |
| aactgctcca ccttcctccc ccccctgctg accccttcg tgcgctcctg gctcgactcc | 1140 |
| ggctccgacc gcgagggcgt cgccaccgtc accaactggc agaccgagag cttcgagacc | 1200 |
| accctgggcc tgaggtccgg cgccttcacc gctcgtggca acagcaacta cttccccgac | 1260 |
| tacttcatcc gcaacatctc cggcgtcccc ctcgtcgtgc gcaacgagga cctgcgcagg | 1320 |
| cccctgcact acaacgagat ccgcaacatc gcctccccca gcggcacccc cggcggcgcc | 1380 |
| cgtgcctaca tggtgtccgt ccacaaccgc aagaacaaca tccacgccgt ccacgagaac | 1440 |
| ggctccatga tccacctcgc tcccaacgac tacaccggct tcaccatcag ccccatccac | 1500 |
| gccacccagg tcaacaacca gacccgcacc ttcatctccg agaagttcgg caaccagggc | 1560 |
| gacagcctga ggttcgagca gaacaacacc accgccgct acaccctgcg cggcaacggc | 1620 |
| aactcctaca acctctacct gcgtgtgtcc tccatcggca acagcaccat ccgcgtcacc | 1680 |
| atcaacggca gggtgtacac cgccaccaac gtcaacacca ccaccaacaa cgacggcgtc | 1740 |
| aacgacaacg gcgcccgctt cagcgacatc aacatcggca acgtggtcgc ttcctccaac | 1800 |

```
tccgacgtcc ccctggacat caacgtgacc ctcaactccg gcacccagtt cgacctgatg    1860
aacatcatgc tggtccccac caacatcagc cccctctact aa                      1902
```

<210> SEQ ID NO 14
<211> LENGTH: 552
<212> TYPE: DNA
<213> ORGANISM: Artificial sequence
<220> FEATURE:
<223> OTHER INFORMATION: Bar gene

<400> SEQUENCE: 14

```
tcaaatctcg gtgacgggca ggaccggacg gggcggtacc ggcaggctga agtccagctg     60
ccagaaaccc acgtcatgcc agttcccgtg cttgaagccg gccgcccgca gcatgccgcg    120 ggggcatat ccgagcgcct cgtgcatgcg cacgctcggg tcgttgggca gcccgatgac     180
agcgaccacg ctcttgaagc cctgtgcctc cagggacttc agcaggtggg tgtagagcgt    240
ggagcccagt cccgtccgct ggtggcgggg ggagacgtac acgtcgact cggccgtcca    300 gtcgtaggcg ttgcgtgcct tccaggggcc cgcgtaggcg atgccggcga cctcgccgtc    360
cacctcggcg acgagccagg gatagcgctc ccgcagacgg acgaggtcgt ccgtccactc    420
ctgcggttcc tgcggctcgg tacggaagtt gaccgtgctt gtctcgatgt agtggttgac    480
gatggtgcag accgccggca tgtccgcctc ggtggcacgg cggatgtcgg ccgggcgtcg    540
ttctgggctc at                                                       552
```

<210> SEQ ID NO 15
<211> LENGTH: 33
<212> TYPE: DNA
<213> ORGANISM: Artificial sequence
<220> FEATURE:
<223> OTHER INFORMATION: TAIL-PCR primer
<220> FEATURE:
<221> NAME/KEY: misc_feature
<222> LOCATION: (25)..(25)
<223> OTHER INFORMATION: n is a, c, g, or t
<220> FEATURE:
<221> NAME/KEY: misc_feature
<222> LOCATION: (27)..(29)
<223> OTHER INFORMATION: n is a, c, g, or t

<400> SEQUENCE: 15

```
acgatggact ccagagcggc cgcvnvnnng gaa                                 33
```

<210> SEQ ID NO 16
<211> LENGTH: 33
<212> TYPE: DNA
<213> ORGANISM: Artificial sequence
<220> FEATURE:
<223> OTHER INFORMATION: TAIL-PCR primer
<220> FEATURE:
<221> NAME/KEY: misc_feature
<222> LOCATION: (25)..(25)
<223> OTHER INFORMATION: n is a, c, g, or t
<220> FEATURE:
<221> NAME/KEY: misc_feature
<222> LOCATION: (27)..(29)
<223> OTHER INFORMATION: n is a, c, g, or t

<400> SEQUENCE: 16

```
acgatggact ccagagcggc cgcbnbnnng gtt                                 33
```

<210> SEQ ID NO 17
<211> LENGTH: 34
<212> TYPE: DNA

```
<213> ORGANISM: Artificial sequence
<220> FEATURE:
<223> OTHER INFORMATION: TAIL-PCR primer
<220> FEATURE:
<221> NAME/KEY: misc_feature
<222> LOCATION: (26)..(26)
<223> OTHER INFORMATION: n is a, c, g, or t
<220> FEATURE:
<221> NAME/KEY: misc_feature
<222> LOCATION: (28)..(30)
<223> OTHER INFORMATION: n is a, c, g, or t

<400> SEQUENCE: 17
acgatggact ccagagcggc cgcvvnvnnn ccaa                    34

<210> SEQ ID NO 18
<211> LENGTH: 34
<212> TYPE: DNA
<213> ORGANISM: Artificial sequence
<220> FEATURE:
<223> OTHER INFORMATION: TAIL-PCR primer
<220> FEATURE:
<221> NAME/KEY: misc_feature
<222> LOCATION: (26)..(26)
<223> OTHER INFORMATION: n is a, c, g, or t
<220> FEATURE:
<221> NAME/KEY: misc_feature
<222> LOCATION: (28)..(30)
<223> OTHER INFORMATION: n is a, c, g, or t

<400> SEQUENCE: 18
acgatggact ccagagcggc cgcbdnbnnn cggt                    34

<210> SEQ ID NO 19
<211> LENGTH: 16
<212> TYPE: DNA
<213> ORGANISM: Artificial sequence
<220> FEATURE:
<223> OTHER INFORMATION: TAIL-PCR primer

<400> SEQUENCE: 19
acgatggact ccagag                                       16

<210> SEQ ID NO 20
<211> LENGTH: 25
<212> TYPE: DNA
<213> ORGANISM: Artificial sequence
<220> FEATURE:
<223> OTHER INFORMATION: TAIL-PCR primer

<400> SEQUENCE: 20
ctgttgccgg tcttgcgatg attat                             25

<210> SEQ ID NO 21
<211> LENGTH: 25
<212> TYPE: DNA
<213> ORGANISM: Artificial sequence
<220> FEATURE:
<223> OTHER INFORMATION: TAIL-PCR primer

<400> SEQUENCE: 21
ttctgttgaa ttacgttaag catgt                             25

<210> SEQ ID NO 22
<211> LENGTH: 25
<212> TYPE: DNA
<213> ORGANISM: Artificial sequence
<220> FEATURE:
<223> OTHER INFORMATION: TAIL-PCR primer
```

```
<400> SEQUENCE: 22
ggtttttatg attagagtcc cgcaa                                     25

<210> SEQ ID NO 23
<211> LENGTH: 20
<212> TYPE: DNA
<213> ORGANISM: Artificial sequence
<220> FEATURE:
<223> OTHER INFORMATION: TAIL-PCR primer

<400> SEQUENCE: 23
ctgcccgtca ccgagatttg                                           20

<210> SEQ ID NO 24
<211> LENGTH: 25
<212> TYPE: DNA
<213> ORGANISM: Artificial sequence
<220> FEATURE:
<223> OTHER INFORMATION: TAIL-PCR primer

<400> SEQUENCE: 24
tcctataggg tttcgctcat gtgtt                                     25

<210> SEQ ID NO 25
<211> LENGTH: 25
<212> TYPE: DNA
<213> ORGANISM: Artificial sequence
<220> FEATURE:
<223> OTHER INFORMATION: TAIL-PCR primer

<400> SEQUENCE: 25
gtactaaaat ccagatcccc cgaat                                     25
```